United States Patent
Kawagoe et al.

(10) Patent No.: US 6,574,536 B1
(45) Date of Patent: Jun. 3, 2003

(54) MOVING APPARATUS FOR EFFICIENTLY MOVING ON FLOOR WITH OBSTACLE

(75) Inventors: Nobukazu Kawagoe, Toyonaka (JP); Yuichi Kawakami, Itami (JP); Kyoko Nakamura, Toyonaka (JP); Yasuhisa Kinto, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 799 days.

(21) Appl. No.: 08/789,127

(22) Filed: Jan. 27, 1997

(30) Foreign Application Priority Data

| Jan. 29, 1996 | (JP) | 8-013134 |
|---|---|---|
| Jan. 29, 1996 | (JP) | 8-013225 |
| Mar. 29, 1996 | (JP) | 8-076953 |

(51) Int. Cl.⁷ ............................. G01C 22/00; G05D 1/00
(52) U.S. Cl. .................... 701/23; 701/24; 15/53.3; 15/98; 15/319; 318/568.1; 318/568.12; 318/568.13; 901/1; 901/5
(58) Field of Search .................. 701/23, 24, 25, 701/26, 27, 117, 118, 301, 302; 318/587, 568.12, 580; 15/340.1, 319, 325, 49.1, 53.3, 98; 901/1, 2, 3; 180/167, 168, 279, 169

(56) References Cited

U.S. PATENT DOCUMENTS

| 4,473,787 A | 9/1984 | Schick ..................... 318/587 |
| 4,700,427 A | 10/1987 | Knepper ..................... 15/319 |
| 4,780,817 A | 10/1988 | Lofgren ..................... 701/23 |
| 4,802,096 A | 1/1989 | Hainsworth et al. ......... 364/461 |
| 4,920,520 A | 4/1990 | Göbel et al. ................ 367/99 |
| 4,962,453 A | 10/1990 | Pong et al. ................. 701/25 |
| 4,982,329 A | 1/1991 | Tabata et al. ............... 701/25 |
| 5,032,775 A | 7/1991 | Mizuno et al. ............. 318/587 |
| 5,036,935 A | 8/1991 | Kohara ..................... 180/168 |
| 5,179,329 A | 1/1993 | Nishikawa et al. ......... 318/587 |
| 5,220,263 A | 6/1993 | Onishi et al. .............. 318/587 |
| 5,280,431 A | 1/1994 | Summerville et al. ......... 701/23 |
| 5,283,739 A | 2/1994 | Summerville et al. ......... 701/23 |
| 5,305,217 A | 4/1994 | Nakamura et al. ............ 701/25 |
| 5,353,224 A | 10/1994 | Lee et al. .................. 701/25 |
| 5,402,051 A | 3/1995 | Fujiwara et al. ............ 318/587 |
| 5,434,490 A | 7/1995 | Ishida et al. ............... 318/587 |
| 5,488,277 A | 1/1996 | Nishikawa et al. .......... 318/587 |
| 5,548,511 A | 8/1996 | Bancroft .................... 701/23 |
| 5,568,589 A | 10/1996 | Hwang ...................... 706/52 |
| 5,613,261 A | * 3/1997 | Kawakami et al. ............ 15/98 |
| 5,636,402 A | * 6/1997 | Kubo et al. ................. 15/98 |
| 5,652,489 A | * 7/1997 | Kawakami .................. 318/587 |
| 5,696,675 A | * 12/1997 | Nakamura et al. ............ 701/25 |
| 5,717,484 A | * 2/1998 | Hamaguchi et al. ......... 356/3.12 |
| 5,720,077 A | * 2/1998 | Nakamura et al. .......... 15/340.1 |
| 5,735,959 A | * 4/1998 | Kubo et al. .................. 15/98 |

FOREIGN PATENT DOCUMENTS

| JP | 61-245215 | 10/1986 |
| JP | 62-154008 | 7/1987 |
| JP | 2-127378 | 5/1990 |
| JP | 3-184105 | 8/1991 |
| JP | 5-165517 | 7/1993 |
| JP | 5-257533 | 10/1993 |
| JP | 6-119035 | 4/1994 |
| JP | 7-47045 | 2/1995 |
| JP | 7-16204 | 3/1995 |

\* cited by examiner

*Primary Examiner*—Jacques H. Louis-Jacques
(74) *Attorney, Agent, or Firm*—McDermott, Will & Emery

(57) ABSTRACT

A moving robot first moves straight in a first forward path. When encountering an obstacle such as shelf, the robot makes a U-turn to move straight in a backward path located with a prescribed distance away from the first forward path. When encountering another obstacle, the robot again makes a U-turn to move straight in a second forward path extending in the same direction as that of the first forward path but located with a distance away from the backward path. When the robot exceeding the point of the U-turn in the first forward path is detected during running in the second forward path, presence of a region where the robot has not run yet is recognized, and running in that region is carried out thereafter.

27 Claims, 22 Drawing Sheets

MOVING APPARATUS FOR EFFICIENTLY MOVING ON FLOOR WITH OBSTACLE

BACKGROUND OF THE INVENTION

1. Field of the Invention

The present invention relates to autonomous moving working vehicles, and more particularly, to an autonomous moving working vehicle for running all over the working range to carry out working such as cleaning and waxing.

2. Description of the Related Art (1) First Related Art

As a conventional autonomous moving working vehicle, Japanese Patent Publication No. 5-82601 for example discloses an autonomous moving working vehicle having a rotatable ultrasonic distance measuring sensor and a dead reckoning function for obtaining position coordinates Xmin, Xmax, Ymin, Ymax of obstacles (such as walls) by the ultrasonic distance measuring sensor, and while running the range surrounded by these four points, correcting these four points using the latest data obtained by the ultrasonic distance measuring sensor to search for a running range.

Further, Japanese Patent Laying-Open No. 5-257533 discloses an autonomous moving working vehicle having a dead reckoning function and a non-contact obstacle sensor. This autonomous moving working vehicle has prescribed information such as a shape of the working region pre-input via a keyboard or the like, but does not have information on obstacles. Accordingly, the vehicle carries out working according to a prescribed regular moving pattern in a region where obstacles are not detected, while in a region where obstacles are detected, it carries out working according to the above-mentioned regular moving pattern within a region where it can avoid the obstacles. More specifically, the vehicle recognizes a lane (hereinafter referred to as a first through path) in which it has been able to run a prescribed distance without detecting obstacles right before an obstacle existing region and a lane (hereinafter referred to as a second through path) in which it has been able to run a prescribed distance without detecting obstacles right behind the obstacle existing region, and recognizes the region surrounded by these two lanes as obstacle existing region. Then, it applies working to an unworked region within the obstacle existing region according to the above-mentioned regular moving pattern from the end point of the lane where it has been able to run a prescribed distance without detecting obstacles right behind the obstacle existing region.

However, the conventional autonomous moving working vehicle disclosed in the above-mentioned Japanese Patent Publication No. 5-82601 determines a cleaning region using the coordinates Xmin, Xmax, Ymin, Ymax and therefore always regards the cleaning region as rectangular region regardless of an actual shape thereof, whereby the area thereof is larger than the actual area, resulting in the need for an additional operation. In addition, searching for an unworked region requires an operation of subtracting a worked region from the above-mentioned rectangular region and therefore the vehicle must store the worked region, whereby memory capacity and operation time are increased with an increased number of obstacles and a complexed shape of the working region. In addition, the vehicle carries out working by running zigzag and making a U-turn when running up against an obstacle, and does not search for an unworked region until it cannot run any more being surrounded by obstacles and thereafter proceeds to the working of the unworked region, whereby it might be required for the vehicle to move a long distance away to the position where it should start the working of the unworked region or to again run the worked region. Therefore, in the case of working such as waxing, and spreading and mopping of antiseptic solution, such re-running on the worked region undesirably degrades the working quality.

Further, the above-mentioned conventional autonomous moving working vehicle disclosed in Japanese Patent Laying-Open No. 5-257533 recognizes an obstacle existing region and an obstacle non-existing region by determining whether or not it has been able to run a prescribed distance without encountering an obstacle, and therefore information on a shape of the working region must be set (taught) before working. Accordingly, troublesome tasks such as premeasurement of the size of the working region must be carried out.

Further, an obstacle in fact seldom corresponds to the pitch of the running lanes of the autonomous moving working vehicle, and therefore a remaining working region is produced between the through path and the obstacle. Accordingly, the vehicle merely carries out the working while simply avoiding obstacles after the first through path and before the second through path without taking the working of the remaining working region into account, producing a remaining working region around the obstacles, in particular, in the vicinity of the sides of the obstacles.

As described above, according to the conventional autonomous moving working vehicles for carrying out working such as floor cleaning while moving on all over the floor, working of such a working region as that being provided with a plurality of obstacles such as shelves and pillars at the wall surface of a room or a hall requires tasks such as map input and teaching, and further, even the autonomous moving working vehicle for automatically determining the size of a room by the distance measuring sensor spends much time in searching for the working region, requires large storage capacity, or the like.

(2) Second Related Art

A cleaning robot for working all over the surface of a designated region is known. Zigzag running is generally employed to control such a cleaning robot. The zigzag running herein means reciprocation in a designated region with a prescribed space between backward and forward paths. The zigzag running is realized by combination of forward moving operation and U-turn operation to the right and left on the plane.

More specifically, the zigzag running includes right zigzag running by which the cleaning robot carries out working to the right (in the direction of the arrow 103) from a working start position 100 to an end position 101 as shown in FIG. 26, and left zigzag running by which it carries out working to the left as shown in FIG. 27. The direction shown by the arrow 103 is hereinafter referred to as a working proceeding direction.

The following method (1) or (2) is used to realize the two kinds of zigzag running.

(1) A user gives instructions such as move forward, make a U-turn, move forward, make a U-turn to the cleaning robot by a remote controller to achieve the zigzag running.

(2) A user inputs the longitudinal length and the transverse length whereby pitch length (the distance between the backward and forward paths in reciprocation) of a U-turn is automatically calculated in consideration of the width by which the cleaning robot can work while moving straight to achieve the zigzag running.

The above method (1) achieves efficient working with a reduced running distance, but a user must input instructions such as move forward and make a U-turn, leading to complex operation.

Meanwhile, the above method (2) fixes a working end position (the position shown by the reference numeral 101 in FIGS. 26 and 27) and therefore cannot efficiently control a moving body.

This gives rise to the problem particularly when such a region formed of two successive rectangular working regions as shown in FIG. 28 is to be subjected to working.

More specifically, after carrying out the first zigzag running from a working start position 100a to an end position 101a, the cleaning robot must move to a start position 100b of the second zigzag running. Such re-running of the already worked region causes a waste of time and battery as well as makes that region dirty.

SUMMARY OF THE INVENTION

The present invention is made to solve the above described problems, and it is an object of the present invention to provide a moving apparatus capable of automatically efficiently moving on all over the working region including unknown obstacles according to simple processing without map input, a mass storage memory, and complicated calculation.

It is another object of the present invention to provide a moving apparatus capable of moving the whole working region with uniform working quality.

It is a further object of the present invention to provide a moving apparatus capable of appropriately controlling a moving body with a simple operation even if an operator has insufficient knowledge.

In order to achieve such objects as described above, a moving apparatus according to one aspect of the present invention includes a running control unit for achieving zigzag running by repeatedly carrying out control including the steps of detecting presence/absence of an obstacle to running while running in a Y direction, storing the Y coordinate of the detected obstacle, and upon detection of the obstacle, stopping running in the Y direction, moving by a prescribed pitch in an X direction perpendicular to the Y direction and thereafter running in the direction opposite to the Y direction; and a recognizing unit for recognizing, upon running in the Y direction beyond previously stored Y coordinate of the obstacle during zigzag running achieved by the running control unit, presence of a remaining running region between a current running path and the obstacle.

A moving apparatus according to another aspect of the present invention includes a running control unit for repeatedly carrying out zigzag running of running a lane in a first direction, moving by a prescribed pitch in a second direction perpendicular to the first direction and thereafter running in the next lane in the direction opposite to the first direction; a measuring unit for measuring a distance up to an obstacle existing in the second direction; and an operation unit for performing an operation of the prescribed pitch employed by the running control unit according to the distance measured by the measuring unit.

A moving apparatus according to a further aspect of the present invention includes a running control unit for repeatedly carrying out zigzag running of running a lane in a first direction, moving by a prescribed pitch in a second direction perpendicular to the first direction and thereafter running in the next lane in the direction opposite to the first direction; a setting unit for setting a region where the moving apparatus moves; an input unit for inputting a position where the moving apparatus completes the movement in the set region; and an operation unit for performing an operation of the prescribed pitch employed by the running control unit based on the region set by the setting unit and the position input by the input unit.

Such an invention as described above allows efficient control of a moving apparatus with simple operation, improving operativity as well as achieving appropriate running.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 1:
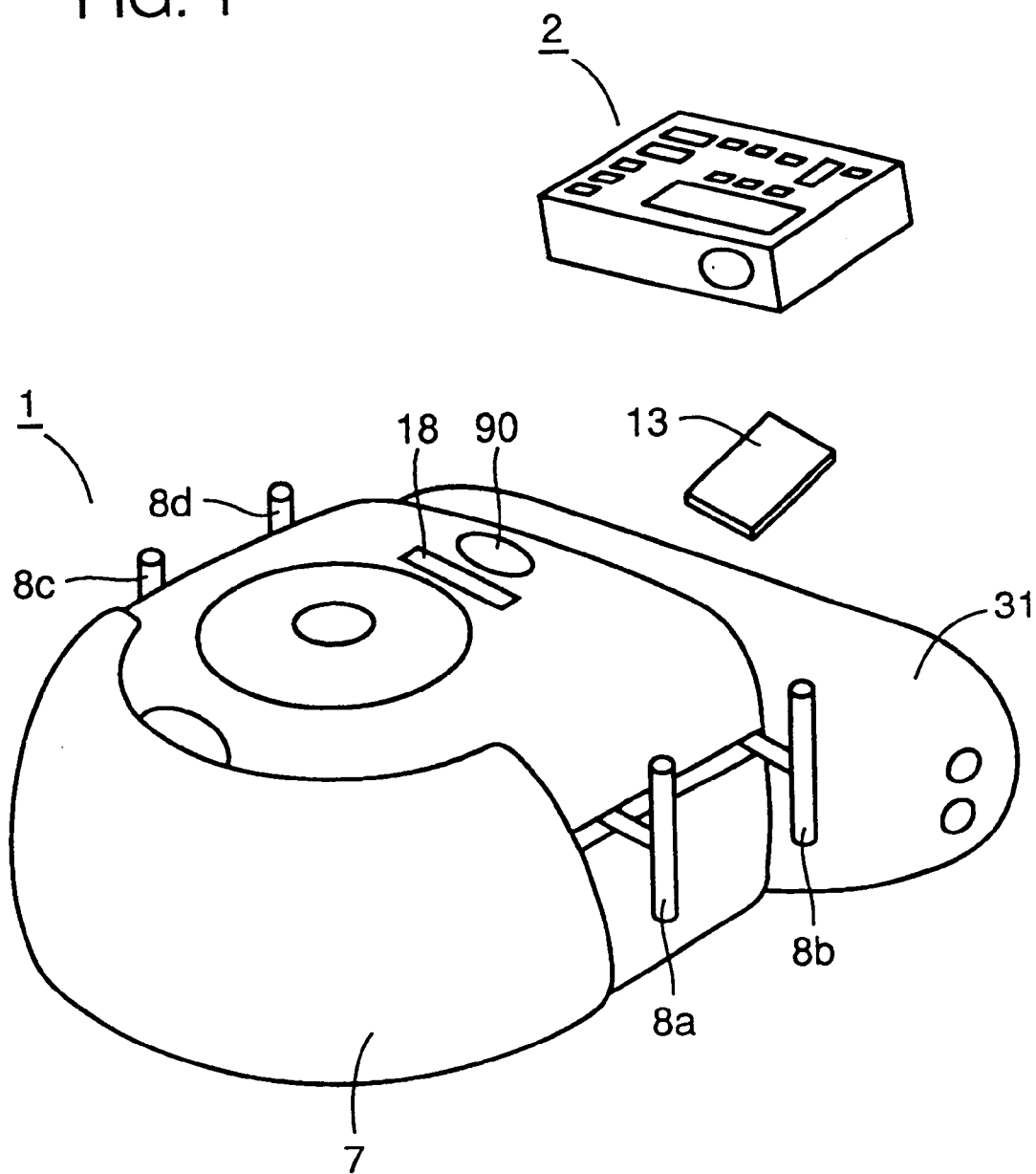
FIG. 1 is a perspective view of a cleaning robot and a controller according to a first embodiment of the invention.

Referring to FIG. 1, a cleaning robot 1 includes a forward obstacle sensor 7 for sensing contact with a wall or the like, following sensors 8a to 8d for measuring the distance up to a wall or the like to achieve running along the wall or the like, a cleaning portion 31 for cleaning a floor surface by rotating a nonwoven fabric cloth, a display unit 18 for displaying a message to a user, and a working start button 90 for starting working. Further, a memory card 13 is inserted into cleaning robot 1, whereby cleaning robot 1 can carry out instructions stored therein.

Figure 2:
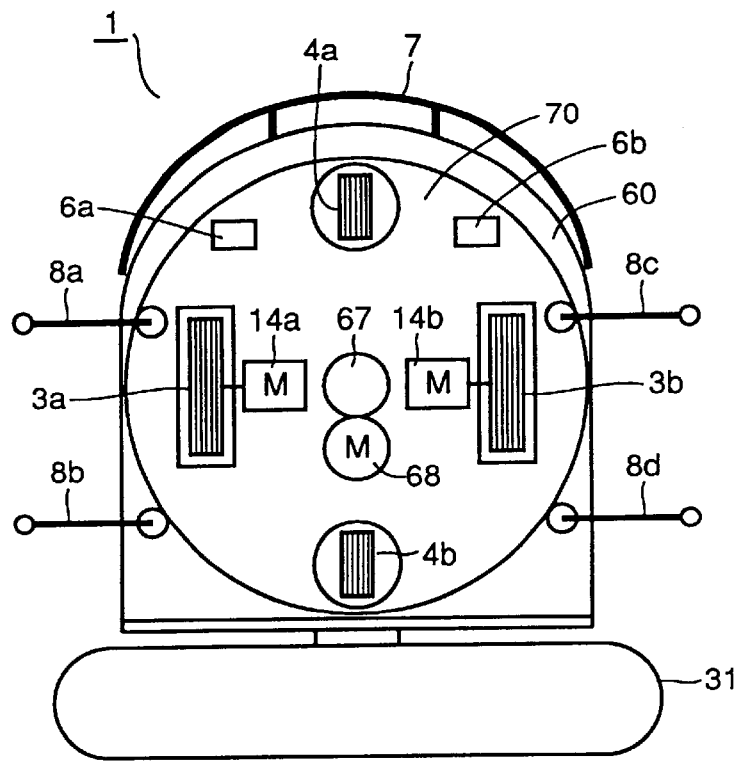
FIG. 2 is a schematic diagram showing the structure of the cleaning robot shown in FIG. 1.

FIG. 2 is a schematic diagram showing the structure of cleaning robot 1 of FIG. 1. Referring to FIG. 2, the cleaning robot includes a main body 60, a running portion 70, a forward obstacle sensor 7, side following sensors 8a to 8d, a left-hand drive wheel 3a, a right-hand drive wheel 3b, a left-hand drive motor 14a, a right-hand drive motor 14b, a front swivel caster wheel 4a, a rear swivel caster wheel 4b, a cleaning portion 31, a main body rotating shaft 67, a main body rotation drive motor 68, a left-hand distance measuring sensor 6a, and a right-hand distance measuring sensor 6b.

Main body 60 is mounted on running portion 70, and is rotatably supported around main body rotating shaft 67 which is perpendicular to the floor surface. Main body 60 is rotatively driven by main body rotation drive motor 68. Running portion 70 is a member for moving the main body of the cleaning robot.

Figure 6:
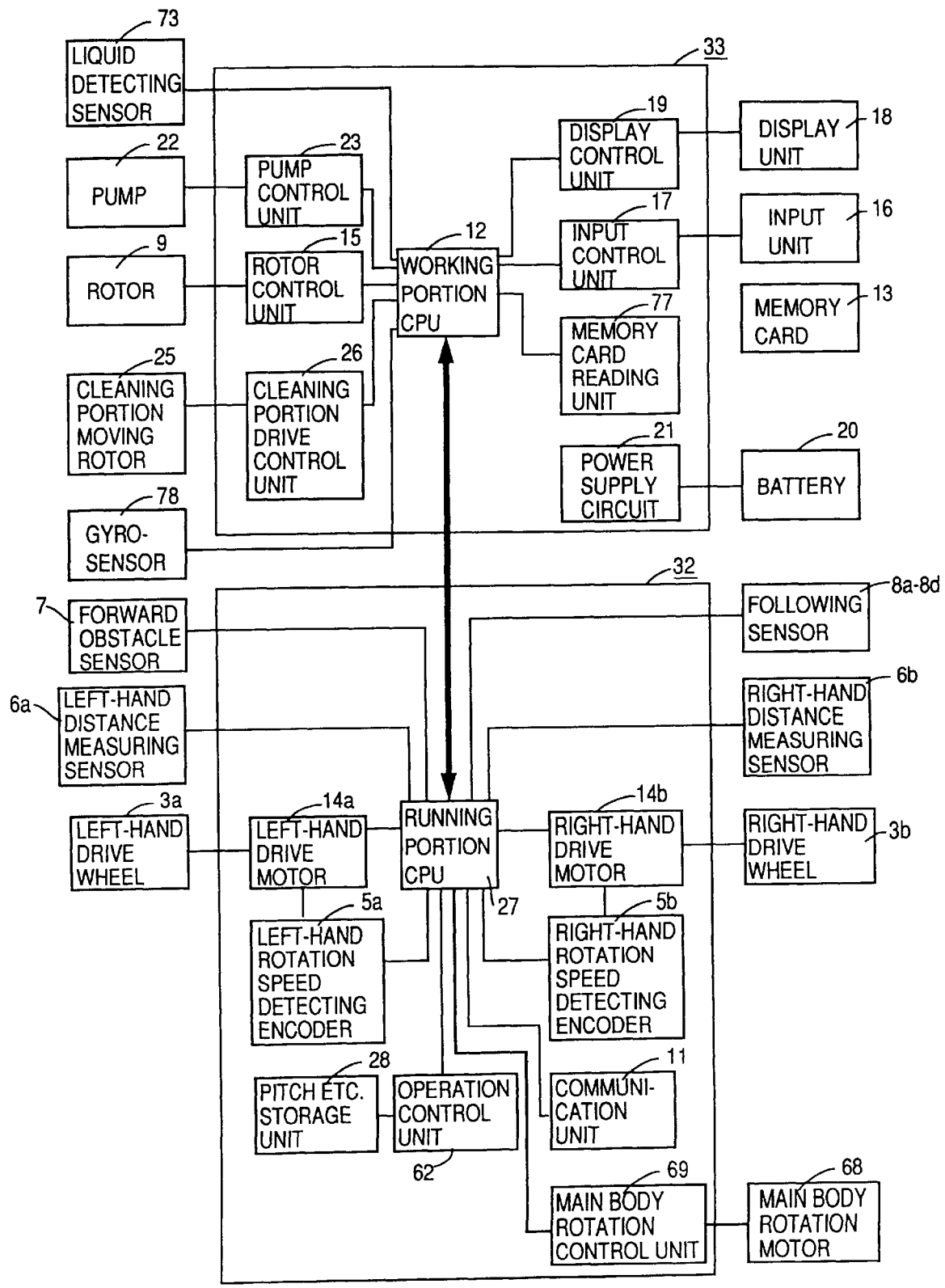
FIG. 6 is a block diagram showing the structure of cleaning robot 1 of FIG. 1.

Forward obstacle sensor 7 is mounted in front of main body 60, and detects the contact with a forward obstacle and outputs an obstacle detection signal to a running control unit 32 (see FIG. 6). Side following sensors 8a to 8d detect the distance up to a wall when the robot moves straight along a wall located on its side. A potentiometer is attached to the right and left sides of main body 60, and a shaft thereof is attached to rotate around a perpendicular axis. A rod projecting in a transverse direction is attached to the shaft of the potentiometer. Thus, the side following sensor is formed. A ball is attached to the tip of the rod so as to prevent damage to the wall. Side following sensors 8a to 8d structured as such are respectively attached to the forward and backward positions on the right and left sides of the cleaning robot.

Left-hand drive wheel 3a and right-hand drive wheel 3b are directly connected to the respective driving shafts of left-hand drive motor 14a and right-hand drive motor 14b to be rotatable independently. Speed of rotation thereof is measured by a left-hand rotation speed detecting encoder 5a and a right-hand rotation speed detecting encoder 5b (see FIG. 6).

Left-hand drive motor 14a and right-hand drive motor 14b are fixed at a body base plate of running portion 70, and are independently driven by running control unit 32 to turn left-hand drive wheel 3a and right-hand drive wheel 3b, thereby achieving forward movement, backward movement, rotation, or curve running.

Front swivel caster wheel 4a and rear swivel caster wheel 4d support the body together with left-hand drive wheel 3a and right-hand drive wheel 3b, and turns the direction of their own wheels according to rotation of left-hand drive wheel 3a and right-hand drive wheel 3b, achieving smooth rotation and curve running.

Cleaning portion 31 is connected to main body 60, and cleans the floor surface. Main body 60 rotates around main body rotating shaft 67 with respect to running portion 70. Main body rotation drive motor 67 is a motor for rotating main body 60 with respect to running portion 70.

The left-hand distance measuring sensor 6a and right-hand distance measuring sensor 6b are sensors for measuring the distance up to obstacles on the left side and on the right side thereof, respectively, and an ultrasonic distance measuring sensor or an optical distance measuring sensor is used as those sensors.

Figure 3:
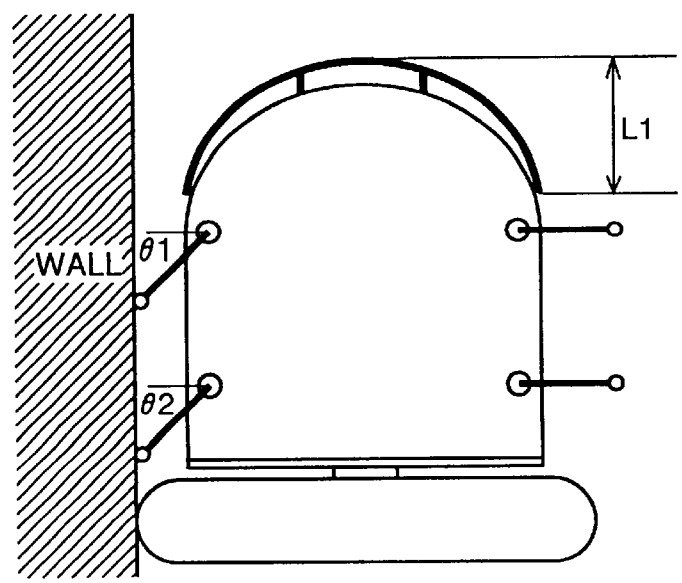
FIG. 3 is a diagram for use in illustration of how a side following sensor is used.

Side following sensors 8a to 8d shown in FIGS. 1 and 2 will now be described in further detail. FIG. 3 is a diagram showing how the side following sensors are used. When the robot runs along a wall located on the side, the tip portions of side following sensors 8a to 8d come in contact with the wall and rotate around the shaft of the potentiometer according to the distance up to the wall, and rotation angles θ1 and θ2 at this time are detected by the potentiometer.

Running control unit 32 calculates both a parallel degree of the wall and the cleaning robot and the distance therebetween based on the rotation angles θ1 and θ2 of forward and backward side following sensors 8a to 8d, and then maintains a prescribed distance such that the lateral side of cleaning portion 31 is in contact with the wall, as well as controls running such that the cleaning robot runs in parallel with the wall.

Figure 4:
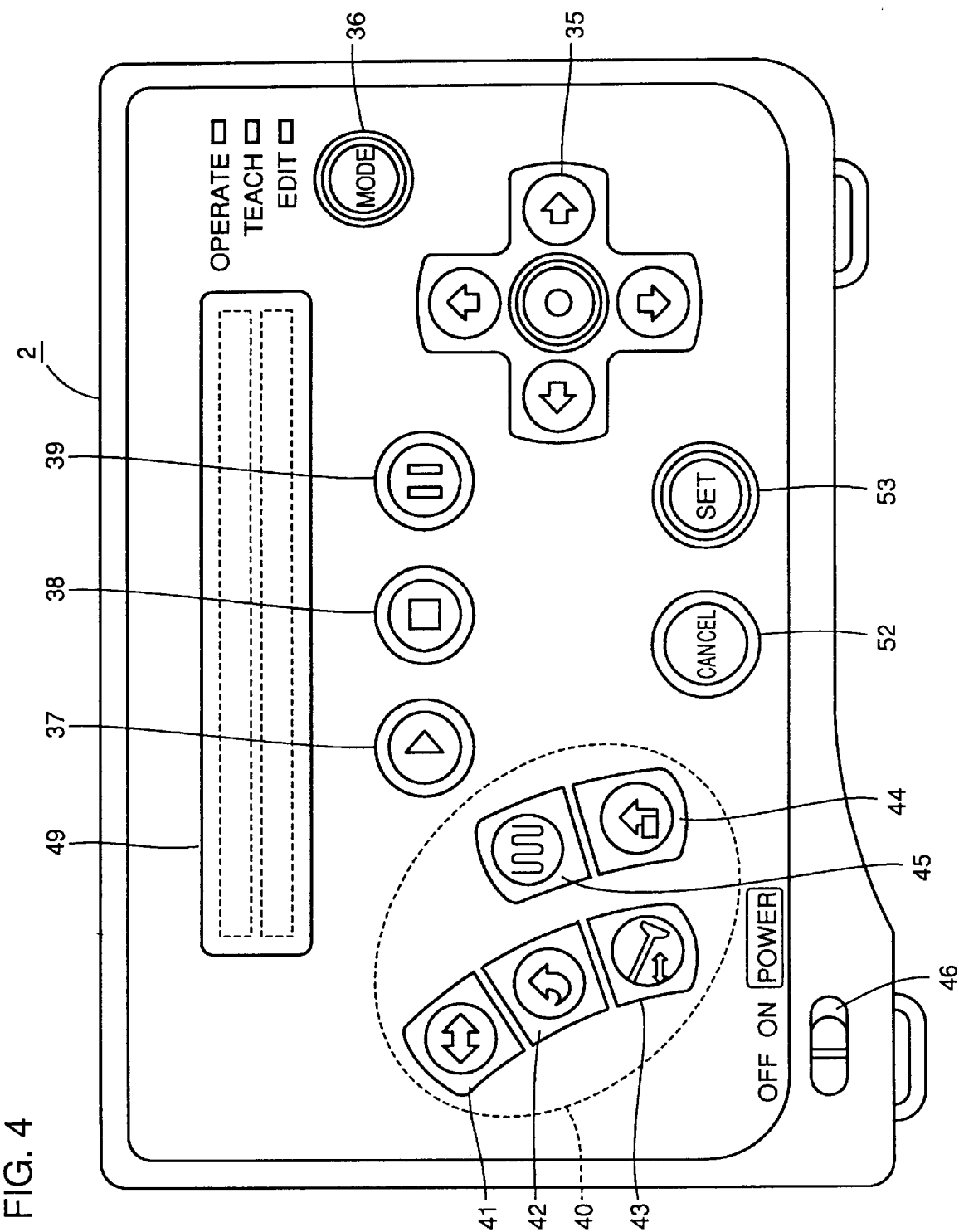
FIG. 4 is a plan view of controller 2 shown in FIG. 1.

FIG. 4 is a plan view of a controller 2 shown in FIG. 1.

Referring to FIG. 4, controller 2 is used to remotely control cleaning robot 1 and to teach running and working. As an input unit of the controller, an operation shift button group 40, a cross-shaped cursor button 35 for designating a direction, a mode switching button 36 for switching a mode, a start button 37 for indicating start of operation of the cleaning robot, a stop button 38 for indicating stop of operation, a pause button 39 for making a pause in operation, a cancel button 52 for canceling the setting, a set button 53 for setting input data, and a power supply switch 46 are provided. Operation shift button group 40 includes a running portion rotation button 41 for turning only the direction of running portion 70 to the right and left without changing the direction of main body 60, a main body rotation button 42 for simultaneously rotating main body 60 and running portion 70, a cleaning portion slide button 43 for moving cleaning portion 31 to the right and left with respect to main body 60, a U-turn button 44 for designating U-turn operation, and a zigzag button 45 for designating zigzag running. Remote control of the cleaning robot, and teaching, editing and setting of working are carried out by combination of these buttons.

Further, controller 2 has display unit 49 constituted by a liquid crystal display.

Figure 5:
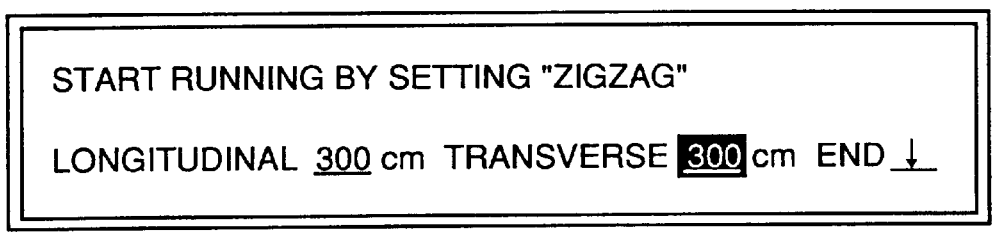
FIG. 5 is a diagram showing a zigzag menu displayed on a display unit 49 of FIG. 4.

Display unit 49 displays a set menu of zigzag running or the like as shown in FIG. 5. A user can input data to the controller through cross-shaped cursor button 35, set button 53 or the like while looking at display unit 49.

FIG. 6 is a block diagram showing the structure of cleaning robot 1 of FIG. 1.

Referring to FIG. 6, cleaning robot 1 generally includes running control unit 32 for controlling running of the robot, and a cleaning control unit 33 for controlling cleaning.

Running control unit 32 includes a microcomputer 27 (referred to as "running portion CPU 27" hereinafter) for managing the processing of the running portion, drive motors 14a and 14b for respectively driving left-hand and right-hand drive wheels 3a and 3b, rotation speed detecting encoders 5a and 5b for respectively detecting the speed of rotation of drive motors 14a and 14b, an operation control unit 62 for controlling an operation, a storage unit 28 for storing a pitch or the like, a communication unit 11 for communicating with the controller, and a rotation control unit 69 for rotating the main body and the running portion with respect to each other.

Forward obstacle sensor 7, following sensors 8a to 8d, left-hand and right-hand distance measuring sensors 6a and 6b, left-hand and right-hand drive wheels 3a and 3b, and main body rotation motor 68 are connected to running control unit 32.

Cleaning control unit 33 includes a microcomputer 12 (referred to as "working portion CPU 12" hereinafter) for managing the processing of the cleaning portion, a display control unit 19 for controlling display of display unit 18, an input control unit 17 for controlling input at an input unit 16, a memory card reading unit 77 for reading memory card 13, a pump control unit 23 for controlling a pump 22 for dropping washing liquid, a rotor control unit 15 for controlling a rotor 9 for spreading the dropped washing liquid over the floor surface as well as moving on the floor surface with pressure and friction, a cleaning portion driving control unit 26 for driving a motor 25 for moving the cleaning portion, and a power supply circuit 21.

Further, a liquid detecting sensor 73 for detecting dropping of washing liquid, a gyro-sensor 78, and a battery 20 are connected to cleaning control unit 33.

Working member CPU 12 and running portion CPU 27 are connected to each other.

Figure 7:
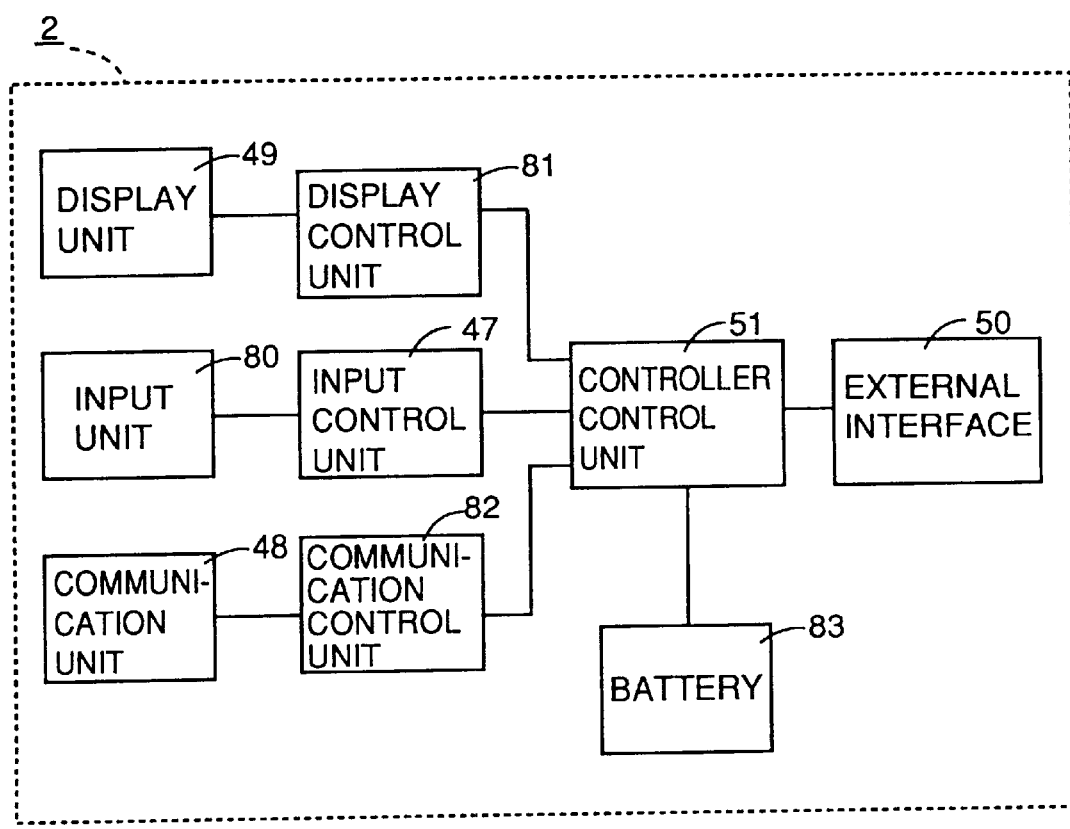
FIG. 7 is a block diagram showing the structure of controller 2 of FIG. 1.

FIG. 7 is a block diagram showing the structure of controller 2.

Referring to FIG. 7, the controller includes a controller control unit CPU 51 for controlling the controller, a display control unit 81 for controlling display unit 49, an input control unit 47 for controlling an input unit 80 constituted by the above-mentioned buttons or the like, a communication unit 48 for communicating with cleaning robot 1, a communication control unit 82 for controlling the communication unit, a battery 83, and an external interface 50.

Controller 2 can be directly or indirectly connected to external apparatuses such as personal computer, printer or the like through external interface 50.

Specific operation of the cleaning robot will now be described.

Figure 14:
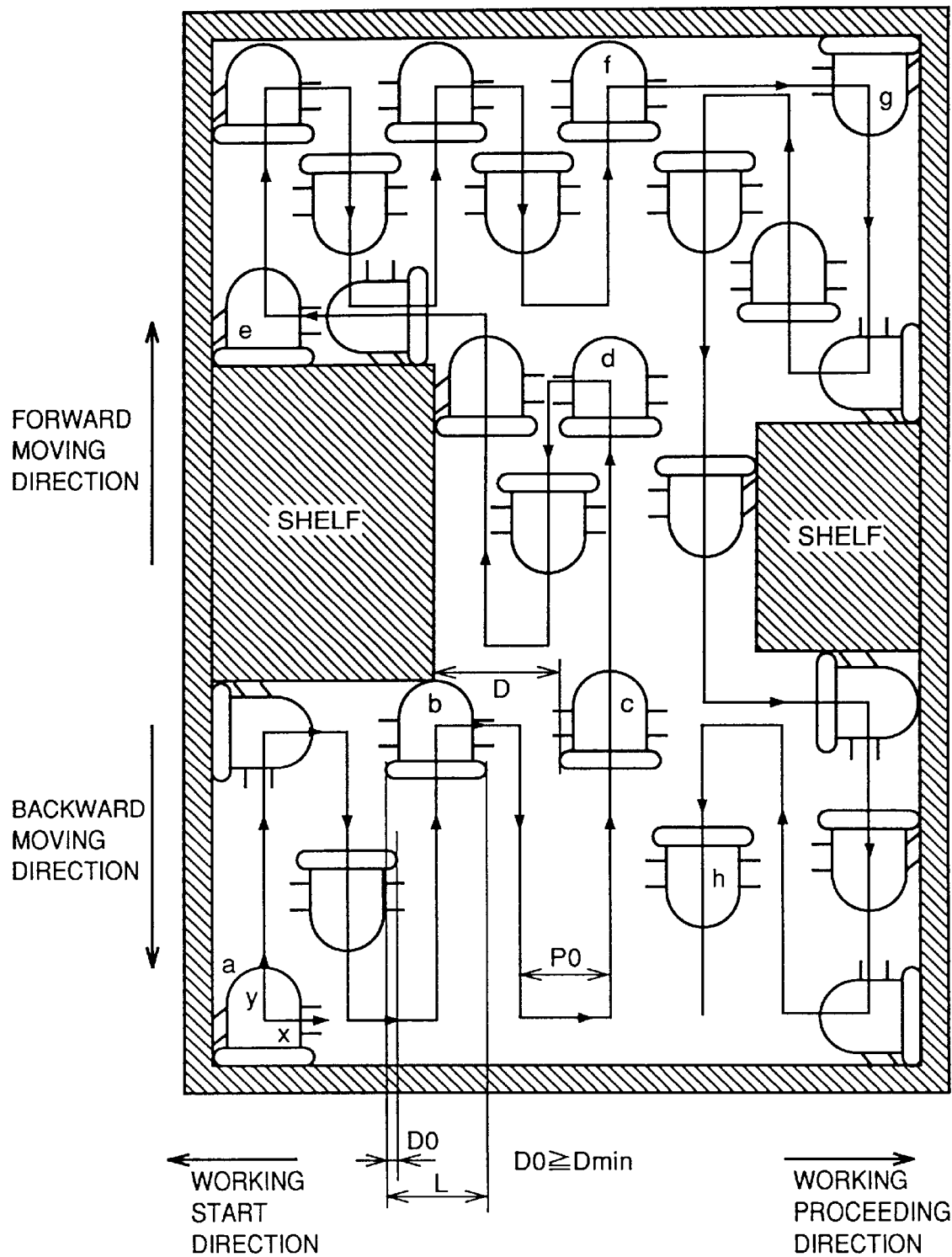
FIGS. 14 to 17 are diagrams for use in illustration of first to fourth operation examples of the cleaning robot shown in FIG. 1, respectively.

Referring to FIG. 14, the cleaning robot carries out cleaning in an environment including obstacles such as shelves. The robot cleans the floor surface by alternately moving straight and making a U-turn. Such running is herein referred to as zigzag running. The direction in which the robot first move from the lower left position in the figure, that is, from the working start point is herein referred to as "the forward moving direction", and the opposite direction thereof is referred to as "the backward moving direction." In addition, the direction in which the working proceeds by repeated zigzag running is herein referred to as "the working proceeding direction," and the opposite direction thereof is referred to as "the working start direction."

The distance P0 between a forward path and a backward path in zigzag running is herein referred to as "a transverse movement pitch."

Further, the cleaning robot stores its own position as coordinates in storage unit 28. For the coordinates, it is assumed that the working start position (at the lower left in the figure) is the origin (x, y)=(0, 0), the working proceeding direction is the positive direction of the x-axis, and the forward moving direction is the positive direction of the y-axis.

When the cleaning robot having started its working from the origin moves in the working proceeding direction by transverse movement pitches P0, the portion surrounded by the left shelf and the positions "c" and "d" in the figure is left unworked. This portion is herein referred to as "a remaining working region." The robot according to the present embodiment can carry out working of the remaining working region.

In addition, the region beside (on the side of the forward moving direction) the left shelf in the figure is herein referred to as "an unworked region." The cleaning robot enters the unworked region and carries out the working there as shown in the figure at the position "e".

The line extending straight in a longitudinal direction from the position "h" of the cleaning robot is herein referred to as "the final lane". The final lane is a lane being in contact with the right shelf in the figure. If the cleaning robot finds an additional unworked region on the side of the working proceeding direction while running in the final lane, it enters the region and carries out the working there, and thereafter, returns to the final lane.

In addition, in FIG. 14, the distance D indicates a width of a remaining working region, the distance L indicates a width (also referred to as a working width) by which the cleaning robot can carry out the working by single straight movement, and the distance D0 indicates an overlapping width of working regions of forward running and backward running in zigzag running (that is, an overlapping width of one running lane and the next running lane in zigzag running).

Figure 8:
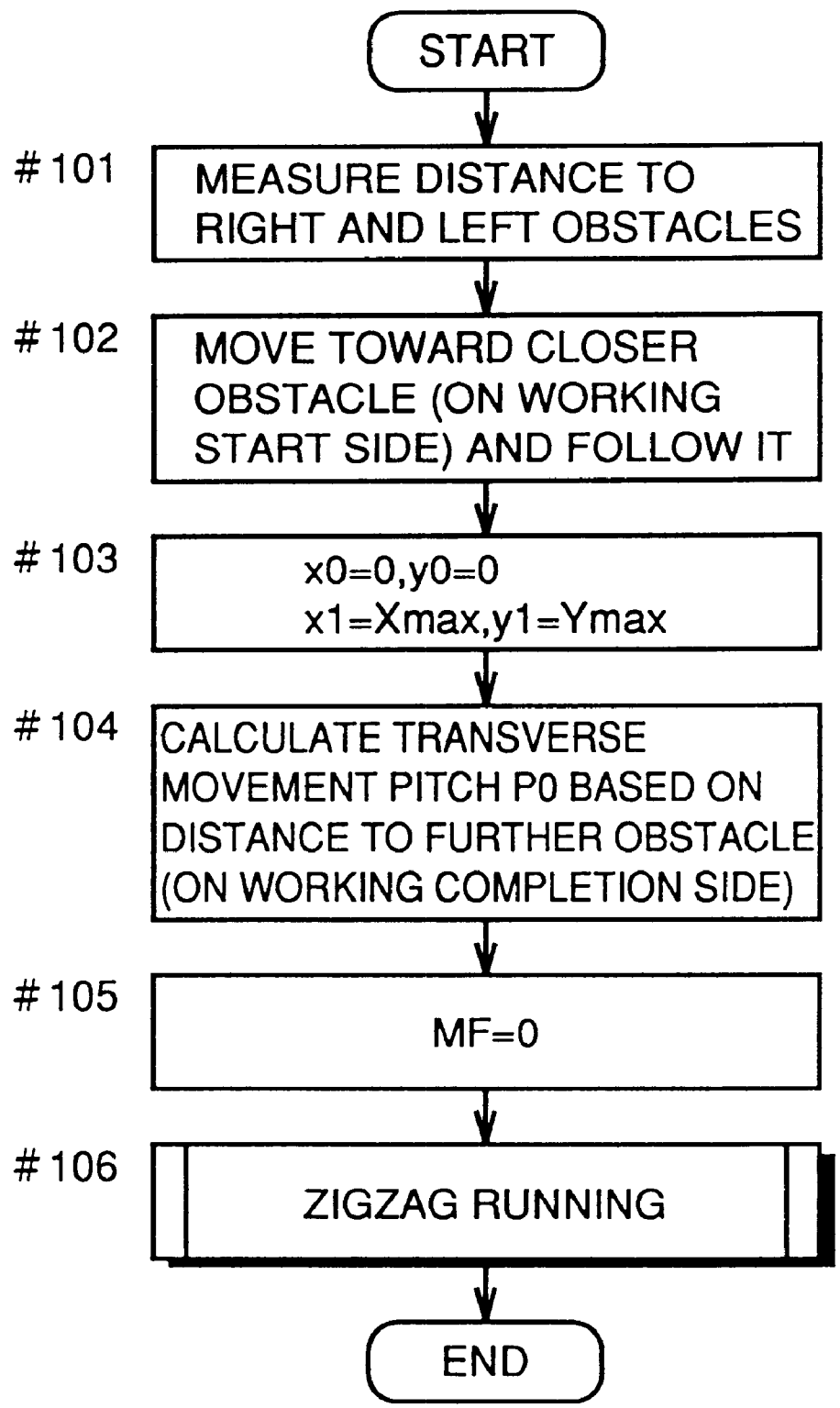
FIG. 8 is a flow chart for use in illustration of the processing of measuring a distance and calculating a transverse movement pitch of zigzag running.

The cleaning robot structured as described above will now be described in detail. FIG. 8 is a flow chart showing the processing of calculating a transverse movement pitch in zigzag running while measuring the distance.

First, at the position where the cleaning robot is placed, the cleaning robot measures the distance to the right-hand and left-hand walls (#101). Next, the cleaning robot rotates by 90° toward a closer wall and moves toward it, and when it comes in contact with the wall, it rotates right for the left wall and left for the right wall by 90° and follows the wall (#102).

Then, variables x, y indicating the position coordinates of the cleaning robot are set to 0, and the current position thereof is set to the origin. In addition, variables x0, y0, x1, y1 indicating a working region are initialized. More specifically, the variables x0, y0 are set to the current position (the origin), and the variables x1, y1 are respectively set to Xmax, Ymax (#102). Note that Xmax and Ymax are pre-input from controller 2 before working.

The variables (x, y) indicating the position coordinates of the cleaning robot are updated with movement of the cleaning robot independently of the processing in the flow chart. Left hand and right-hand rotation speed detecting encoders 5a and 5b are used for updating.

Then, transverse movement pitch P0 is calculated according to the following expressions based on the distance up to the farther wall (the wall on the side of the working proceeding direction) (#104). By these expressions, the pitch P0 can be set so that the cleaning robot may complete the whole working with the working in a backward path along the wall on the side of the working proceeding direction.

$$P0 = (W - L/2)/m \quad (1)$$

$$P0 < L - D\text{min} \quad (2)$$

where m is the maximum positive even number satisfying the expression (2), W is the distance from the center of the cleaning robot to the farther wall, which is calculated based on a measurement value of the distance measuring sensors in consideration of the position where the distance measuring sensors are mounted on the cleaning robot, L is a working width of the cleaning robot, and Dmin is the minimum value of an overlapping width D of the current running lane and the previous running lane in zigzag running, which is predetermined according to the straight movement performance of the cleaning robot.

Then, a mode flag MF indicating whether the present working is normal working or working of a remaining working region is set to 0 (#105). Note that MF=0 indicates a normal working mode, and MF=1 indicates a remaining working region working mode.

Finally, a subroutine of zigzag running is executed (#106), thereby completing the working.

Figure 9:
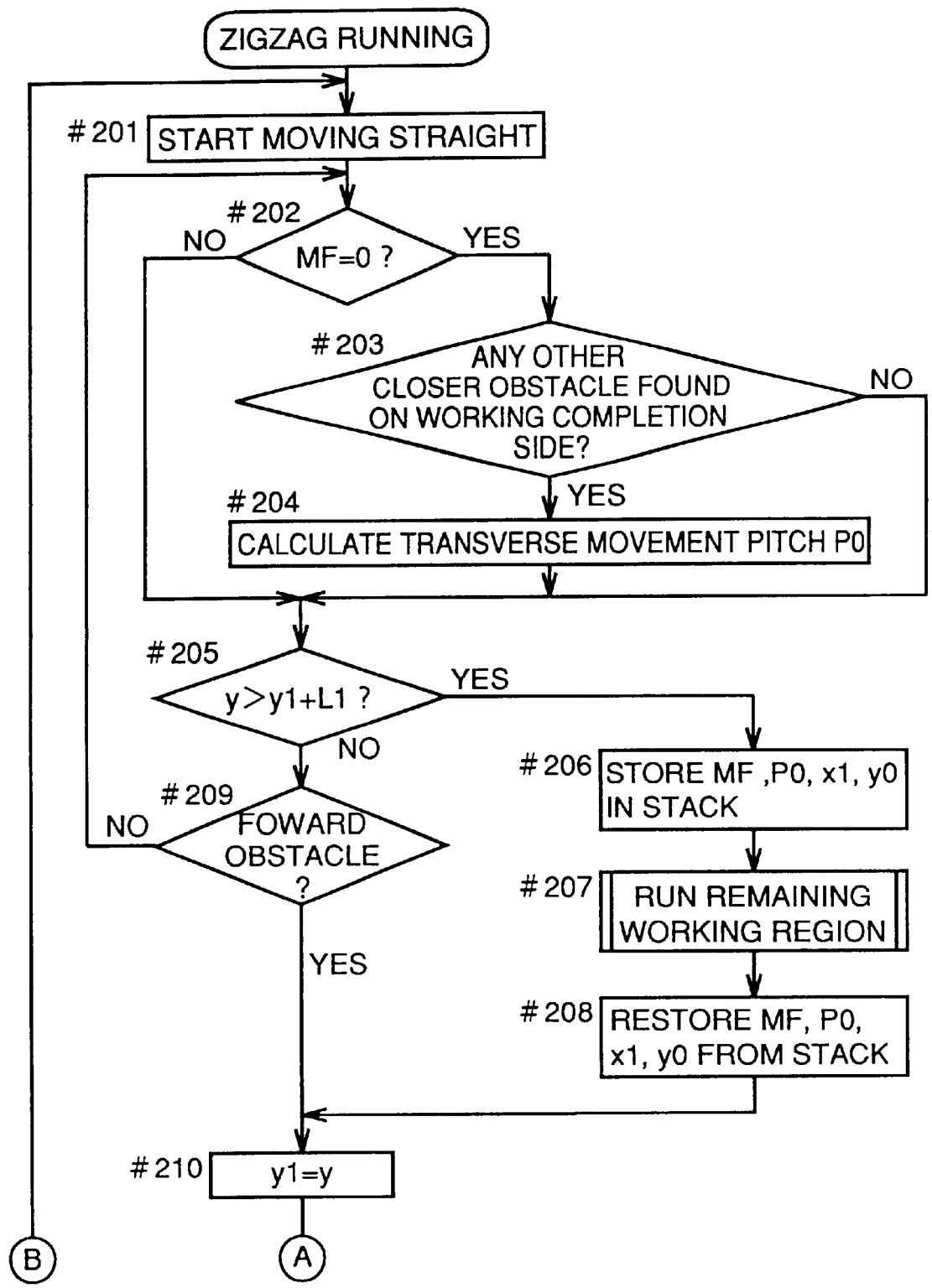
FIGS. 9 and 10 together show a flow chart for use in illustration of the processing for zigzag running shown in FIG. 8.
Figure 10:
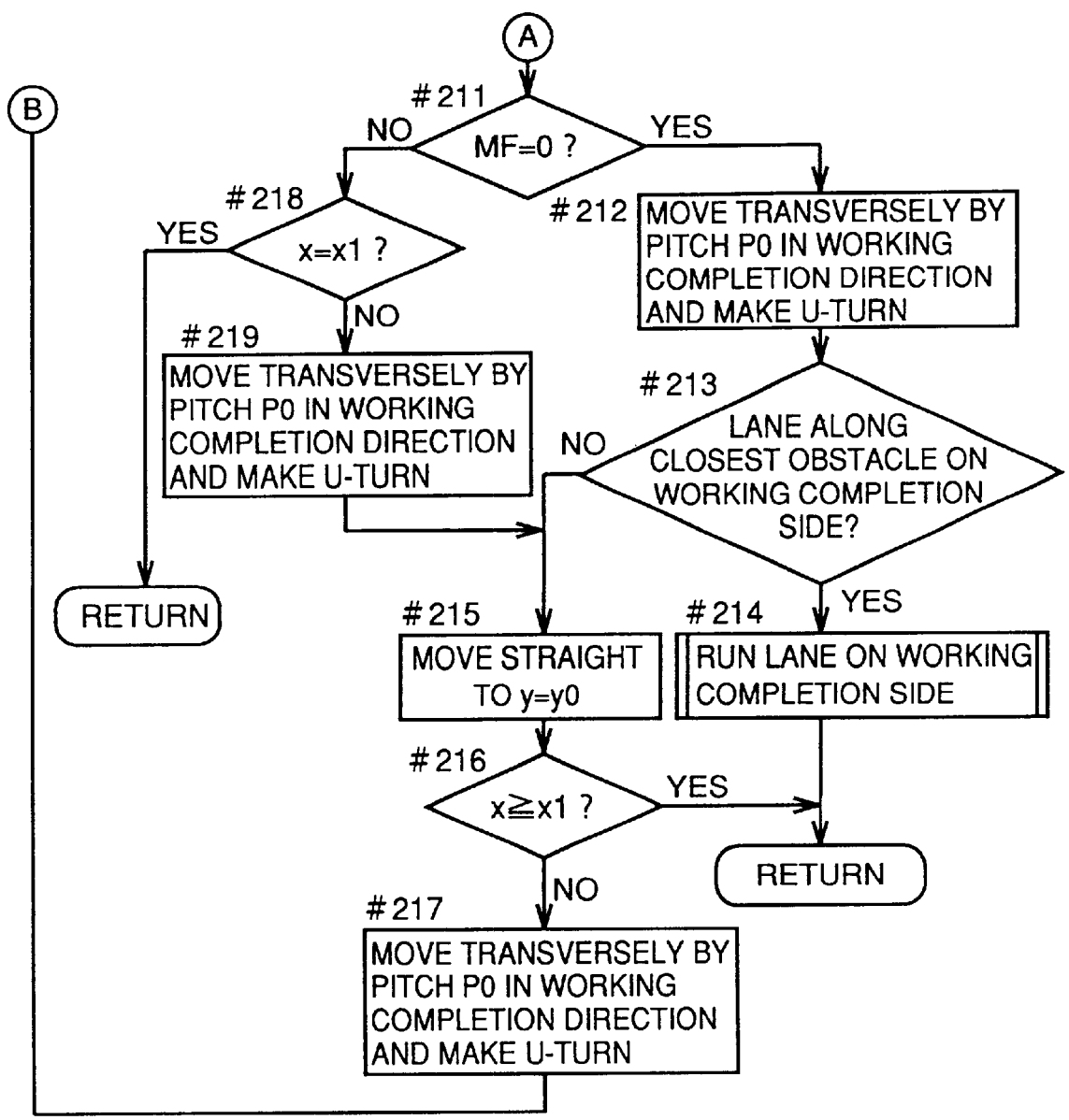

The subroutine of zigzag running shown in FIG. 8 will now be described in further detail. FIGS. 9 and 10 together show a flow chart for use in illustration of the zigzag running subroutine for recursive call.

First, straight movement is started (#201). Then, mode flag MF is determined (#202). MF=0 indicates a normal working mode and the step then proceeds to #203, while MF=1 indicates a remaining working region working mode and the step then proceeds to #205.

When MF=0, the distance W to an obstacle on the working completion side (on the side of the working proceeding direction in FIG. 14) is measured and the x coordinate (=x+W) of the obstacle is calculated from the current position x of the cleaning robot itself and the measured distance W at #203. If the obstacle is closer to the side of the working start direction than any other previously found obstacles (YES at #203), the step proceeds to #204, wherein P0 is recalculated according to the expression (1) so that the cleaning robot will run along that obstacle in a backward path. Meanwhile, if MF=1 indicating that the current working is not working of a normal region, the steps #203 and #204 will not be carried out.

Then, whether the y coordinate of the current position is larger than y1 (a variable indicating a working region) at least by a prescribed amount L1 or not is determined (#205). L1 is the distance between a line linking the right end with the left end of forward obstacle sensor 7 and the forwardmost end thereof (see FIG. 3). According to the present embodiment, since the forward obstacle sensor is curved, the difference of at most L1 may be produced in the forward moving distance according to the contact position of the forward obstacle sensor with a forward obstacle during forward movement. The prescribed amount L1 is added in order to verify that an obstacle does not come into contact with the forward obstacle sensor at all. If y≦y1+L1, the step proceeds to #209, and otherwise proceeds to #206.

When y>y1+L1, the current y coordinate is larger than the maximum value of the y coordinate in the previous running lane and therefore presence of an obstacle in the forward moving direction of that running lane is recognized. In the following step #207, working of a remaining working region between the obstacle and the current running lane is carried out after the current mode flag MF, transverse movement pitch P0, x1 and y0 are stored in a stack (#206). This is carried out in order to recursively call the zigzag running subroutine in the remaining working region running subroutine and rewrite MF, P0, x1, and y0 to new values while executing it.

Then, working of the remaining working region is carried out with the remaining working region running subroutine (#207). The remaining working region running subroutine will be described later.

When the remaining working region running subroutine is completed to return to the normal running, MF, P0, x1, and y0 saved in the stack are restored (#208), and the step proceeds to (#210).

Meanwhile, when y≦y1+L1, whether contact/non-contact with a forward obstacle or not is determined (#209). If not in contact, the step goes back to #202, and if in contact, proceeds to #210. If in contact with the forward obstacle, the y coordinate of the current position is substituted for y1 (#210).

Then, whether mode flag MF is 0 or 1 is determined (#211). This step is carried out in order to determine whether the current running is normal running or running in a remaining working region since the zigzag running subroutine may be called in the subroutine of running in a remaining working region and in the subroutine of running in a lane on the working completion side and operation slightly different from the normal running may be required.

Then, when MF=0, the cleaning robot is rotated by 90° toward the working proceeding direction (see FIG. 14) and moves in that direction by transverse movement pitch P0. Thereafter, the cleaning robot is further rotated by 90°, completing a U-turn with transverse movement pitch P0 (#212).

Then, whether the current running lane is a running lane (the final lane) along an obstacle having the smallest x coordinate on the working completion side (on the side of the working proceeding direction) or not is determined (#213). If so, the step proceeds to #214, and otherwise proceeds to #215.

More specifically, if so, the subroutine of running in a lane on the working completion side is executed (#214) and thereafter the zigzag running subroutine is completed, returning to the main flow.

Meanwhile, if not, the cleaning robot moves straight to the position y0 (#215). This is the running in a backward path.

Then, whether the current x coordinate is at least the maximum value x1 of the working region or not is determined (#216). If so, the zigzag running subroutine is completed, returning to the main flow. If not, the cleaning robot is rotated by 90° toward the working proceeding direction and moves straight in that direction by transverse movement pitch P0, and thereafter, is further rotated by 90° to complete a U-turn with transverse movement pitch P0 (#217), whereby the step goes back to #201.

Figure 11:
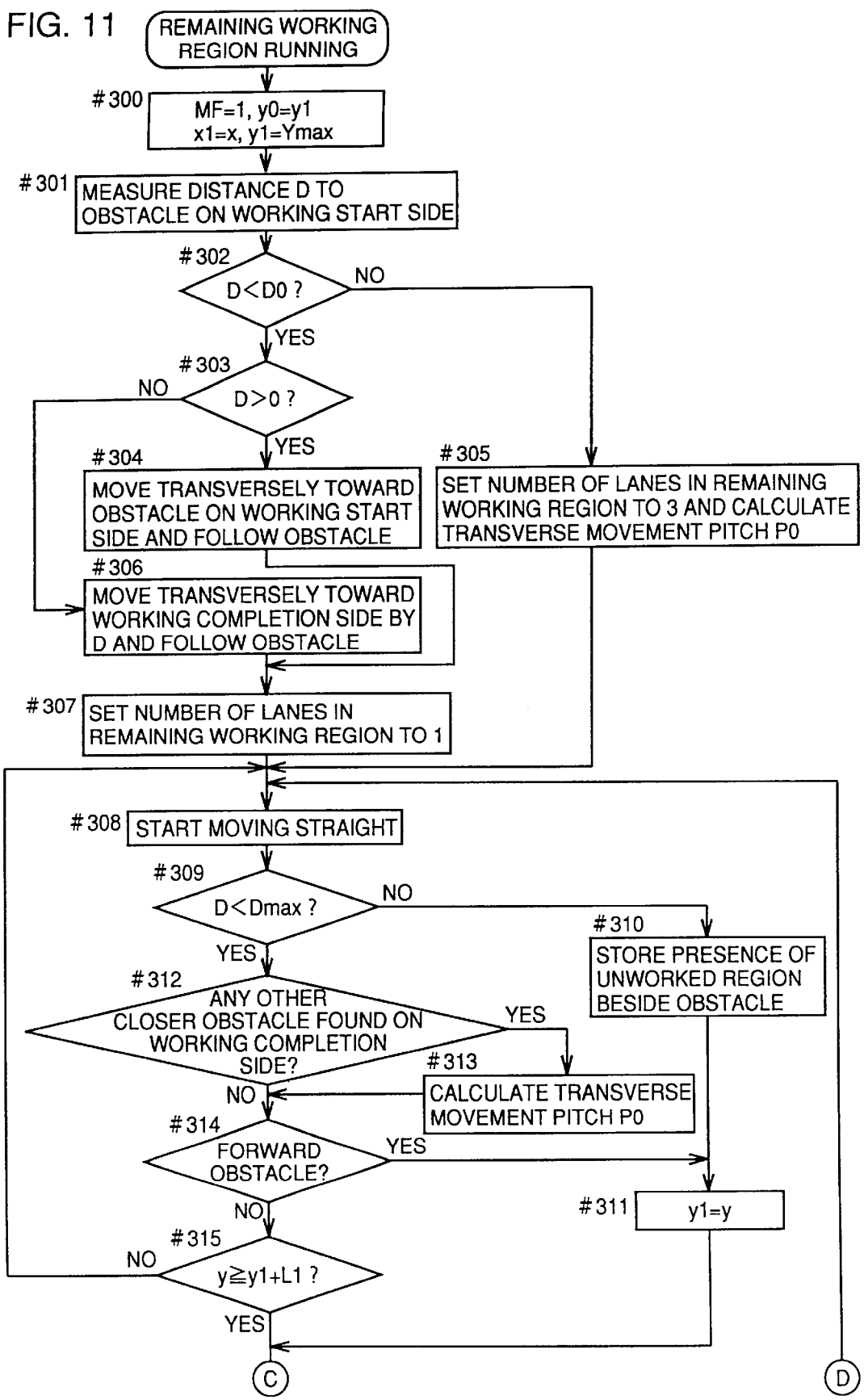
FIGS. 11 and 12 together show a flow chart for use in illustration of a subroutine for running in a remaining working region shown in FIG. 9.
Figure 12:
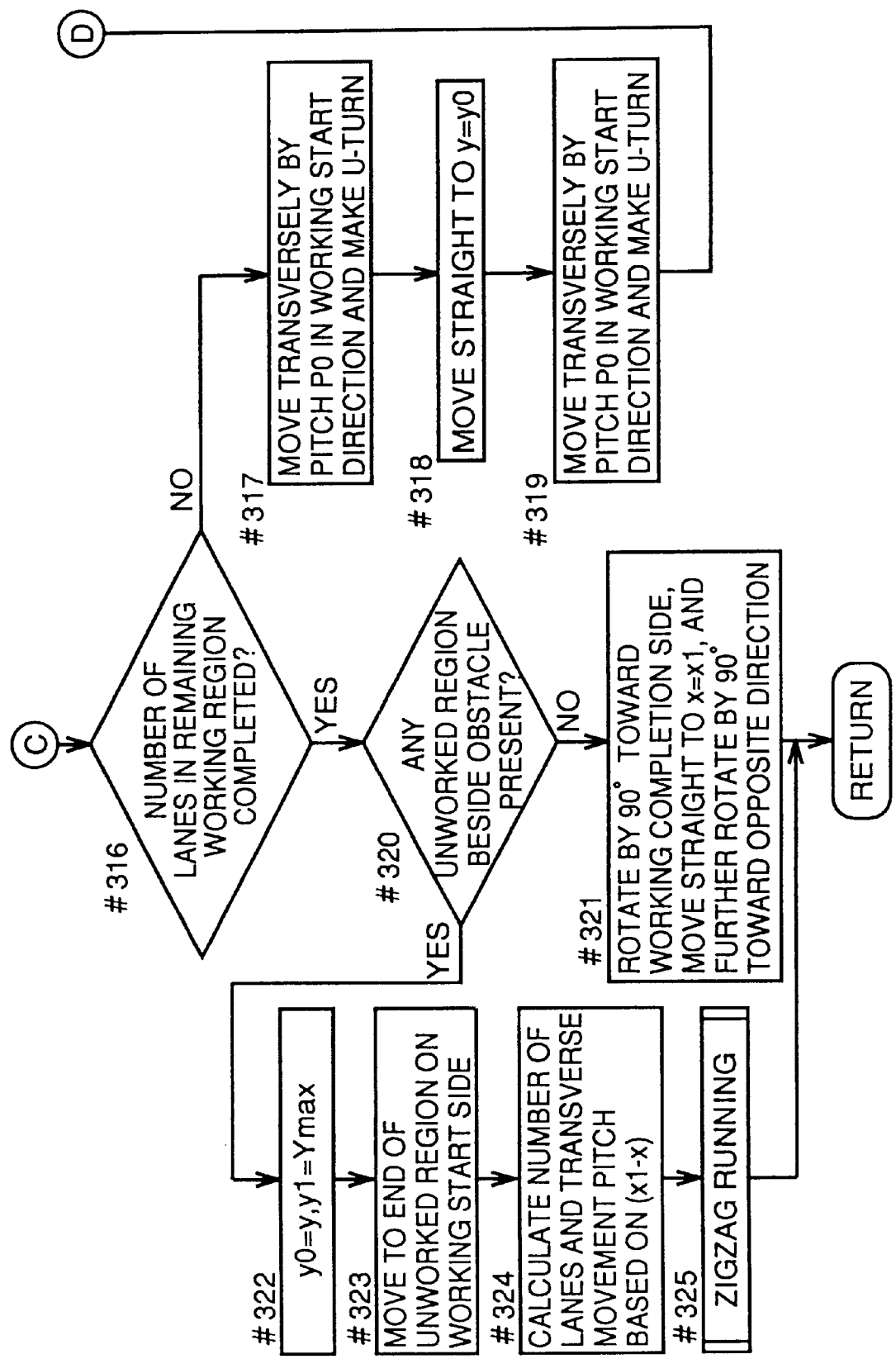

The remaining working region running subroutine shown in FIG. 9 will now be described in further detail. FIGS. 11 and 12 together show a flow chart illustrating the remaining working region running subroutine for carrying out zigzag running in a remaining working region.

First, mode flag MF is set to 1, y1 is substituted for the lower limit value y0 of the y coordinate of the working region, the current x coordinate is substituted for the upper limit value x1 of the x coordinate thereof, and Ymax is substituted for the upper limit value y1 of the y coordinate thereof (#300). Then, the distance D (see FIG. 14) up to an obstacle on the side of the working start direction is measured (#301). D is the distance from the end of the cleaning portion on the side of an obstacle to the obstacle, and is calculated based on the output of distance measuring sensors 6a and 6b in consideration of the position where distance measuring sensors 6a and 6b are mounted on the cleaning robot.

Then, D is compared with a prescribed value D0 (#302). If D is less than D0, the step proceeds to #303, and otherwise proceeds to #305. D0 herein indicates an overlapping amount (an overlapping width) of previous running lanes, and is calculated from working width L and transverse movement pitch P0 of the cleaning robot according to the following expression.

$$D0 = L - P0 \quad (3)$$

When $D \geq D0$, the cleaning robot runs the remaining working region by zigzag running (by reciprocating one and a half times). Transverse movement pitch P0 at this time is calculated according to the following expression (#305) and the step proceeds to #308.

$$P0 = (D - L/2)/3 \quad (4)$$

Meanwhile, according to the present embodiment, the width of the forward obstacle sensor is smaller than that of the cleaning portion and therefore the cleaning portion may come into contact with an obstacle while moving forward even if the forward obstacle sensor does not detect a forward obstacle. In this case, width D of the remaining working region is negative. If D<0, the cleaning robot transversely moves by D to the side (the side of the working proceeding direction) opposite to that of an obstacle located on the working starting side to follow the obstacle (#306), and carries out working with the number of running lanes being set to 1 (#307).

Meanwhile, if 0<D<D0, the width of the remaining working region is small and therefore the cleaning robot transversely moves toward an obstacle located on the working starting side to follow the obstacle (#304), and carries out working with the number of running lanes being set to 1 (#307). Even in such a case, the amount of transverse movement is within the overlapping amount of previous running lanes and therefore a portion that is left unworked will not be produced thereafter as well.

Then, straight movement is started (#308). Next, the distance D up to an obstacle located on the side of the working start direction is measured and is compared with a prescribed value Dmax (#309). Dmax is the maximum width of a remaining working region and is calculated according to the following expression.

$$Dmax = 2 \times L \quad (5)$$

If D is equal to or larger than Dmax, the step proceeds to #310, and otherwise proceeds to #312.

When D is equal to or larger than Dmax, it is recognized that the obstacle on the side of the working start direction has disappeared. Then, presence of an unworked region beside the obstacle on the side of the working start direction is recognized, and that information is stored in a prescribed flag(#310). Then, the y coordinate of the present position is substituted for y1 for storage (#311), and the step proceeds to #316.

Meanwhile, when D is less than Dmax and it is recognized that another obstacle is present on the side of the working start direction, the cleaning robot still moves straight. Then, while the robot is moving straight, the distance W from the center of the robot itself to the obstacle on the working completion side (on the side of the working proceeding direction) is measured, and the x coordinate (=x+W) of the obstacle is calculated from the current position x of the robot itself and the distance W. Then, if the obstacle is closer to the side of the working start direction than any other previously found obstacles (#312), the step proceeds to #313, and otherwise proceeds to #314.

If the obstacle is closer to the side of the working start direction than any other previously found obstacles, P0 is recalculated according to the above expression (1) (#313) so that the cleaning robot will run along that obstacle in a backward path.

Then, contact/non-contact with a forward obstacle is determined (#314). If in contact, the step proceeds to #311, and the y coordinate of the present position is substituted for y1 for storage. If not, the step proceeds to #315.

If not in contact with the forward obstacle, whether the y coordinate of the present position is larger than y1 at least by a prescribed amount L1 or not is determined (#315). If in contact, the step proceeds to #316, and otherwise goes back to #308.

When the y coordinate of the current position is larger than y1 at least by L1, whether the number (the value obtained in #305 or #307) of running lanes in the remaining working region has been completed or not is determined (#316). If not, the step proceeds to #317, and otherwise proceeds to #320.

If not completed, the cleaning robot is rotated by 90° toward the working start direction and moves straight in that direction by transverse movement pitch P0, and thereafter is further rotated by 90°, thereby completing a U-turn with transverse movement pitch P0 (#317).

Then, the cleaning robot moves straight until the y coordinate becomes y0 (#318). The value y0 is the y coordinate of the start position of the remaining working region stored in #301.

Then, the cleaning robot is rotated by 90° toward the working start direction and moves straight in that direction by transverse movement pitch P0, and thereafter is further rotated by 90°, thereby completing a U-turn with transverse movement pitch P0 (#319), and the step goes back to #308.

Meanwhile, when the number of running lanes in the remaining working region have been completed, presence/absence of an unworked region beside the obstacle (which has been already stored in #310) is determined (#320). If present, the step proceeds to #322, and otherwise proceeds to #321.

If absent, working of the remaining working region is completed, wherein the cleaning robot is rotated by 90° in the working proceeding direction, moves straight to the position of x=x1, and is further rotated by 90° toward the backward moving direction (the direction opposite to the previous rotation direction) (#321), thereby completing working of the remaining working region to return to the main flow.

Meanwhile, if present, the y coordinate of the current position is substituted for y0, and Ymax is substituted for y1 (#322). Note that in the zigzag running subroutine carried out in the following step #325, y0 is the y coordinate of the start position of the working region and y1 is an initial value of the y coordinate of the end position thereof. The variable x1 remains at a value set in #300, which is the x coordinate of the end of a remaining working region on the side of the working proceeding direction and becomes the x coordinate of the end position in the zigzag running subroutine carried out in #325.

Then, after moving straight up to the transversely movable position, the cleaning robot is rotated by 90° toward the working start direction, moves straight to the end of an unworked region on the side of the working start direction, and is further rotated by 90° toward the backward moving direction (the direction opposite to the previous rotation direction) to follow the wall (#323). This is the state "e" of FIG. 14.

Then, the working width of the unworked region is obtained from the x coordinate of the current position and x1, and the number m of running lanes and transverse movement pitch P0 are calculated according to the following expressions (#324).

$$P0=(x1-x)/m \quad (6)$$

$$P0<L-Dmin \quad (7)$$

where m is the maximum positive even number satisfying the above expression (7), L is a working width of the cleaning robot, and Dmin is the minimum value of an overlapping width of the current running lane and the previous running lane in zigzag running, which is predetermined according to the straight movement performance of the cleaning robot.

Finally, after the zigzag running subroutine is executed (#325), the remaining working region running subroutine is completed, returning to the main flow. If a remaining working region is produced during this zigzag running subroutine, the remaining working region running subroutine is recursively called.

Figure 13:
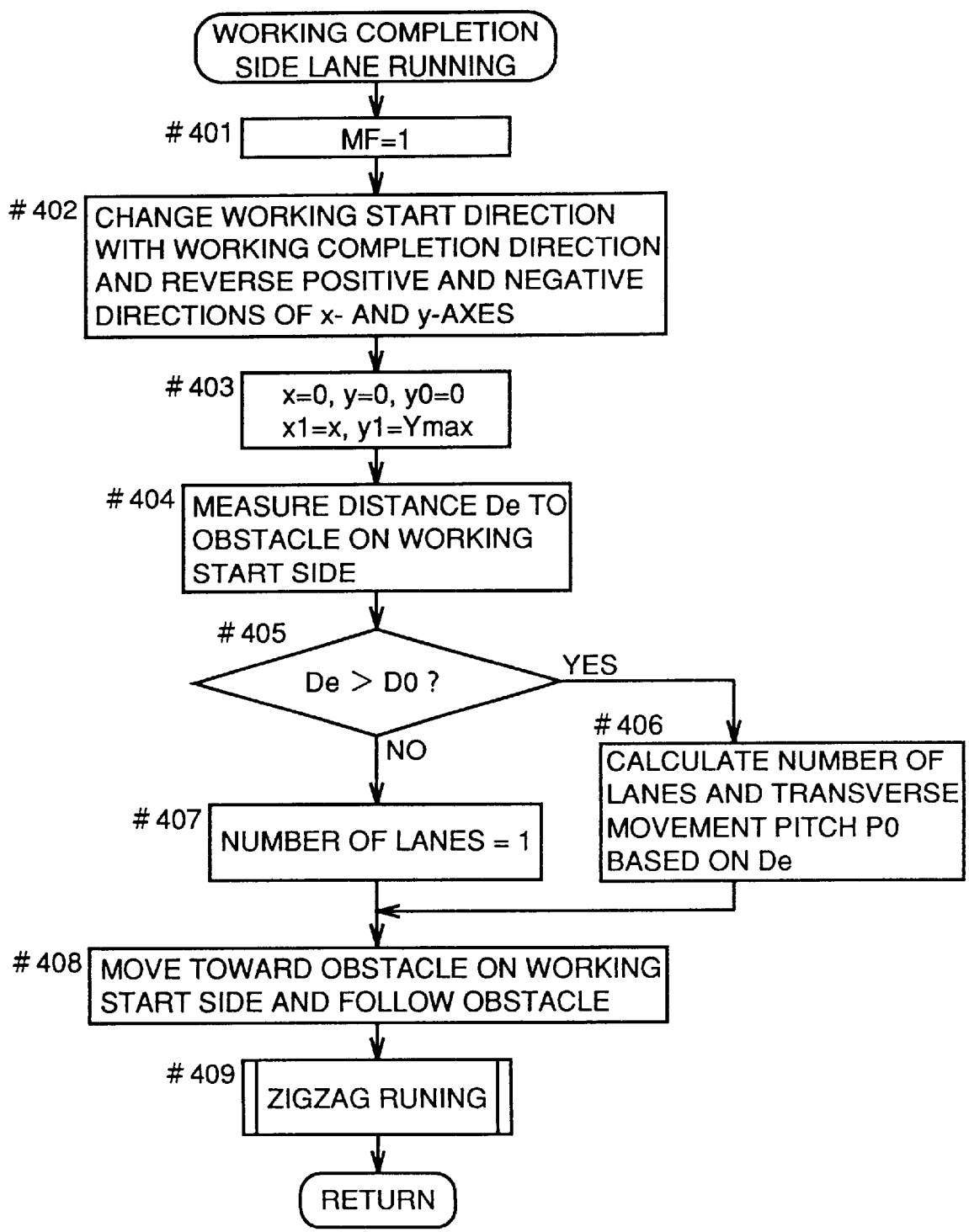
FIG. 13 is a flow chart for use in illustration of a subroutine for running in a lane on the working completion side shown in FIG. 10.

The subroutine of running in a lane on the working completion side shown in FIG. 10 will now be described in further detail. FIG. 13 is a flow chart showing the working completion side lane running subroutine for carrying out zigzag running in a running lane on the working completion side.

First, mode flag MF is set to 1 which indicates that the current running is not normal running (#401). Then, a corresponding flag is corrected so that the working start direction is changed to the working proceeding direction and the working proceeding direction is changed to the working start direction as well as a corresponding flag is corrected so that the forward moving direction is changed to the backward moving direction and the backward moving direction is changed to the forward moving direction. Thus, the positive and negative directions of the x- and y-axes are reversed (#402).

Next, 0 is substituted for x and y so that the current position is made to the origin. In addition, the y coordinate 0 of the current position is substituted for the y coordinate y0 of the working region start point of the zigzag running subroutine executed in #409, the x coordinate 0 of the current position is substituted for the x coordinate x1 of the working end point thereof, and Ymax is substituted for the y coordinate y1 of the working end point (#403).

Then, the distance De up to an obstacle located on the side of the working start direction (since being reversed in #402, this is the working proceeding direction in the normal running) is measured (#404).

Next, De is compared with a prescribed value D0 (#405). If De is equal to or smaller than D0, the step proceeds to #407, and otherwise proceeds to #406. D0 herein indicates an overlapping amount of previous running lanes, and is calculated from working width L and transverse movement pitch P0 of the cleaning robot according to the following expression.

$$D0=L-P0 \quad (8)$$

If De is larger than D0, the number m of running lanes and transverse movement pitch P0 are calculated based on De (#406).

$$P0=(De-L/2)/m \quad (9)$$

$$P0<L-Dmin \quad (10)$$

where m is the maximum positive even number satisfying the above expression (10), L is a working width of the cleaning robot, and Dmin is the minimum value of an overlapping width of the current running lane and the previous running lane in zigzag running and is predetermined according to the straight movement performance of the cleaning robot.

Meanwhile, if De is equal to or smaller than D0, De is small and therefore the number m of running lanes is set to 1 (#407).

Then, the cleaning robot is rotated by 90° toward the working start direction (the working proceeding direction in the normal running), moves straight to the end on the side of the working start direction, and is further rotated by 90° toward the forward proceeding direction (the direction opposite to the previous rotation direction) to follow the wall (#408).

Finally, after the zigzag running subroutine is executed (#409), the completion side lane running subroutine is completed, returning to the main flow. At this time, zigzag running which is reversed in right and left movement and in backward and forward movement with respect to the normal running is carried out, and the remaining working region subroutine is executed if a remaining working region is found, as in the case of the previously described normal running.

Specific operation of the cleaning robot according to each of the above-mentioned flow charts will now be described. FIG. 14 is a diagram for use in illustration of a first operation of the cleaning robot shown in FIG. 1.

Referring to FIG. 14, the point a indicates the original position of the working region in #103. More specifically, in this case, the cleaning robot is first located at a position close to the left wall, and moves to that position in #101–#102. Then, in #104, the distance up to the right wall is measured and transverse movement pitch P0 is calculated.

The point b indicates the position where the cleaning robot comes into contact with the forward shelf for the last time after repeated zigzag running in #201–#205. From now on, the y coordinate of this position is y1. During zigzag running, the distance up to the right wall is periodically measured in #203–#204, but only the first wall has been found and therefore transverse movement pitch P0 remains as it is.

Then, for the first time in zigzag running, the cleaning robot reaches a region without a forward wall, that is, the point c, which is therefore forward in position with respect to the point b. This is found in #205, and the step proceeds to #206 and thereafter to the remaining working region running subroutine. Then, the cleaning robot slightly moves straight to the position where it can measure distance up to the shelf beside it, and measures the distance D up to the left shelf. In this case, since the distance up to the shelf is large, it is determined that the cleaning robot carries out working in front of the shelf by reciprocating one and a half times, and transverse movement pitch P0 is calculated.

Then, in #309, the distance to the left shelf is measured during straight movement, and at the point d where the distance to the left obstacle is increased, it is found that the left shelf has disappeared. Then, presence of an unworked region beside the left shelf is stored (#309–#310).

Next, the cleaning robot carries out working of the remaining working region by zigzag running, and moves along the left shelf to the point e along the wall (#323). Then, transverse movement pitch P0 is calculated in #324, but in this case, the current position is located along the same wall as the original one and therefore the calculation results in the same transverse movement pitch as the original one.

The point f is the position where working of an unworked region is completed by executing the zigzag running subroutine (#325). Thereafter, the cleaning robot moves from the point f to the next running lane by U-turn, but this is the lane along a shelf placed at the right wall and therefore the step proceeds from #213 to #214 to execute the completion side lane running subroutine, whereby the cleaning robot moves to the right wall at the point g and follows the wall.

Then, with right and left as well as backward and forward directions being reversed, the cleaning robot carries out zigzag running up to the point h, completing the working.

Figure 15:
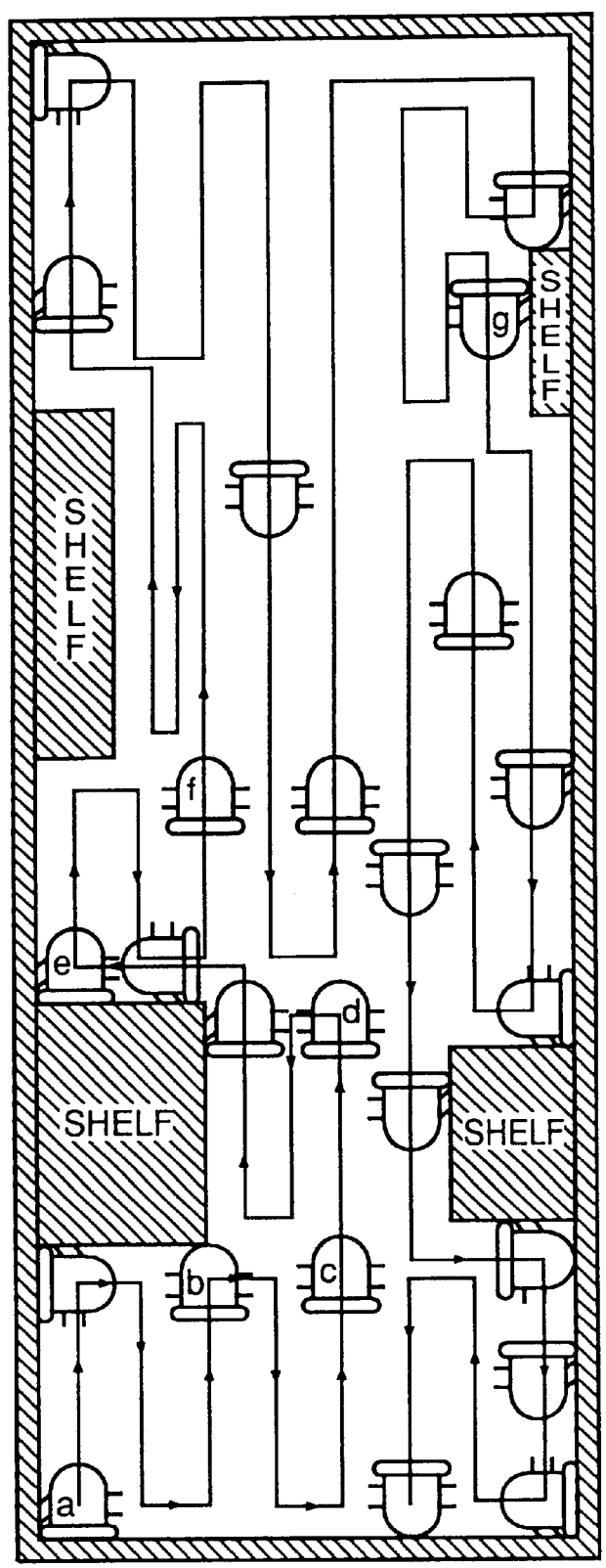

A second operation of the cleaning robot shown in FIG. 1 will now be described. FIG. 15 is a diagram for use in illustration of the second operation of the cleaning robot shown in FIG. 1.

Referring to FIG. 15, since the operation from the point a to the point e of FIG. 15 is the same as that of FIG. 10, detailed description thereof will not be repeated herein and the operation after the point e will be described in the following.

First, at the point f, the cleaning robot detects generation of an additional remaining working region while carrying out working of an unworked region beside the shelf. Then, at the point g, it finds a remaining working region while executing the completion side lane running subroutine and carries out working therein.

Figure 16:
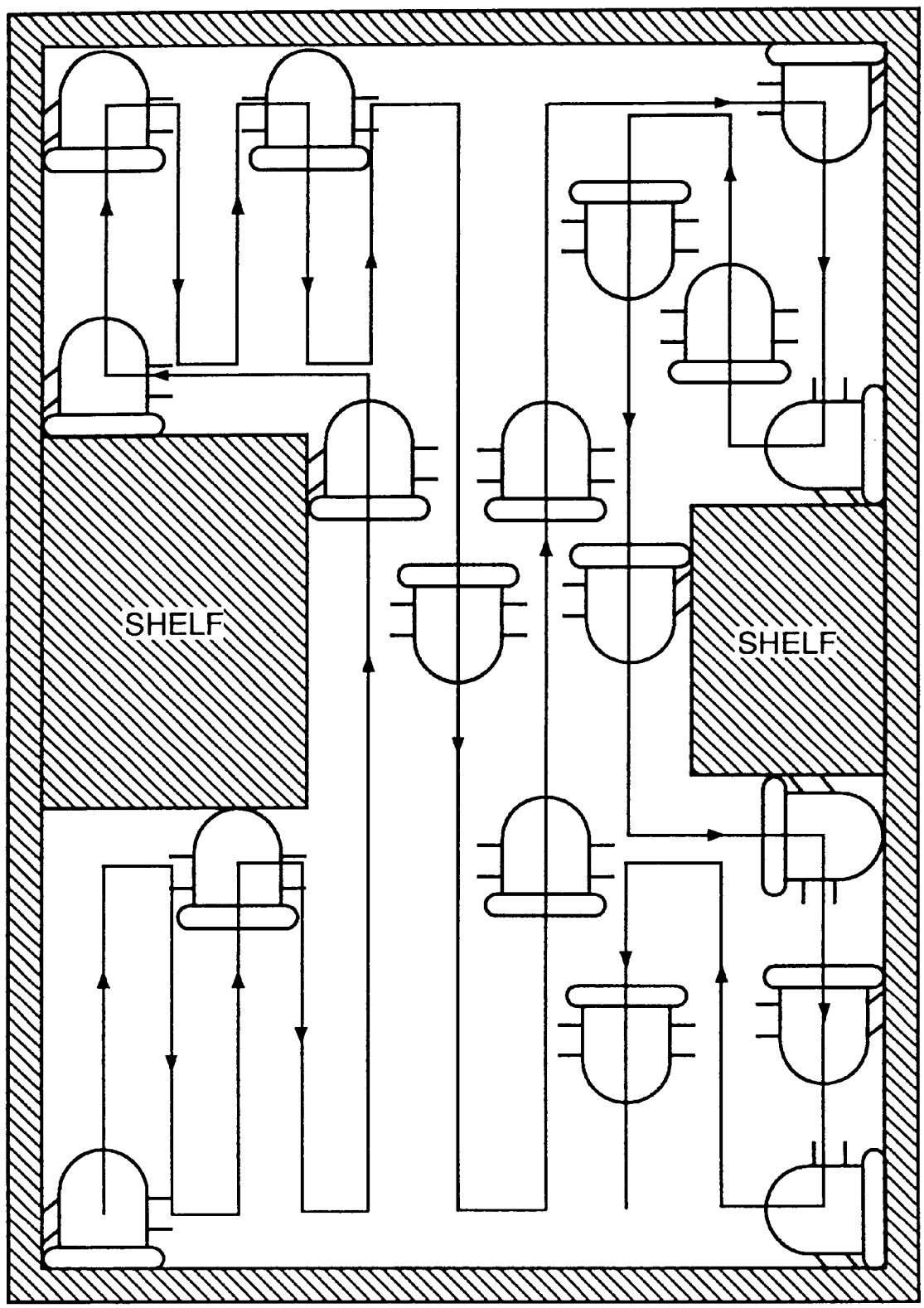

A third operation of the cleaning robot shown in FIG. 1 will now be described. FIG. 16 is a diagram for use in illustration of the third operation of the cleaning robot shown in FIG. 1.

At the position corresponding to the point c in the first operation shown in FIG. 14, generation of a remaining working region is found and thereafter such a transverse movement pitch P that prevents generation of a remaining working region at the left shelf is calculated based on the width of that remaining working region and the x coordinate of the current position, and is stored in a pitch storage unit 28. Then, from the next time, transverse movement pitch P stored in pitch storage unit 28 is used as initial transverse movement pitch, whereby working can be carried out so as to prevent generation of a remaining working region at the left shelf as shown in FIG. 16. At this time, such transverse movement pitch P that prevents generation of a remaining working region at the left shelf is calculated according to the following expressions.

$$P=(x1-D)/m \quad (11)$$

$$P<L-D\min \quad (12)$$

where m is the maximum positive even number satisfying the above expression (12), x1 is the x coordinate of the position corresponding to the point c in FIG. 14, D is the distance at this position from an obstacle on the side of the working start direction to the end of the cleaning robot on the side of the working start direction, L is a working width of the cleaning robot, and Dmin is the minimum value of an overlapping width between the current running lane and the previous running lane in zigzag running and is predetermined according to the straight movement performance of the cleaning robot.

Note that a plurality of transverse movement pitch values may be stored in pitch storage unit 28 and therefore an effective result can be obtained even if a remaining working region is produced twice or more as shown in FIG. 15.

Figure 17:
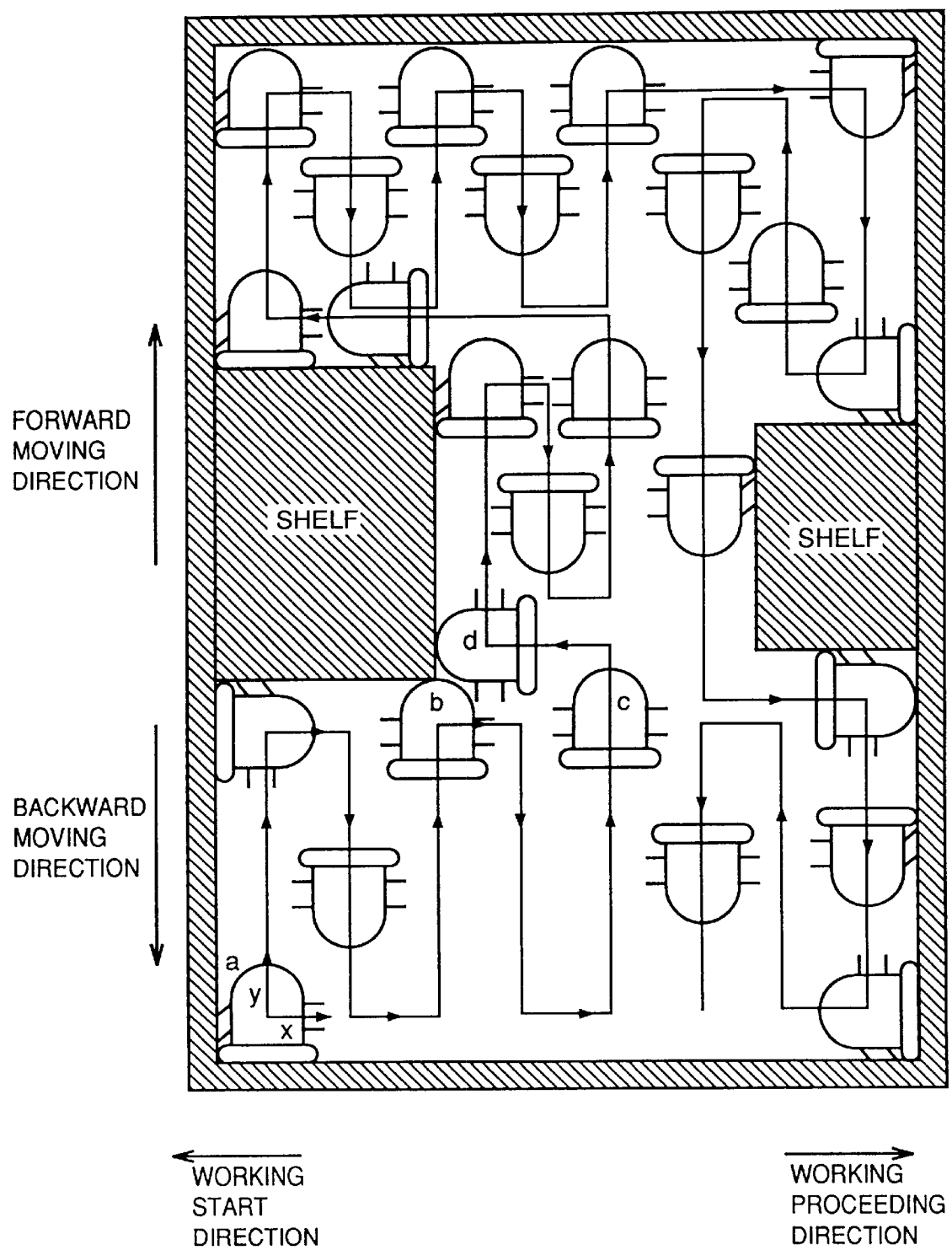

A fourth operation of the cleaning robot will now be described. FIG. 17 is a diagram for use in illustration of the fourth operation of the cleaning robot shown in FIG. 1.

Although, in the foregoing description, width D of a remaining working region is measured by left-hand distance measuring sensor 11a or right-hand distance measuring sensor 11b for measuring the distance up to an obstacle located in a transverse direction, the width of the remaining working region can be measured without using these distance measuring sensors. FIG. 17 is a diagram for use in illustration of a method of measuring the width of a remaining working region without using a distance measuring sensor.

First, at the point c of FIG. 17, the cleaning robot finds generation of a remaining working region and thereafter moves straight by the distance corresponding to a half of the body width and is rotated by 90° toward the working start direction. Then, it moves straight in the working start direction until it comes in contact with an obstacle (the point d of FIG. 17). The width of the remaining working region can be known from the distance of the transverse movement at this time. More specifically, working of the remaining working region is carried out from the working proceeding direction in the working start direction in FIG. 14, while being carried out from the working start direction in the working completion direction in FIG. 17. As described above, the movement up to an obstacle allows the width of a remaining working region to be measured without using a distance measuring sensor.

[Second Embodiment]

The structure of a cleaning robot according to the second embodiment is the same as that shown in FIGS. 1 to 7.

A method of controlling the cleaning robot according to the present embodiment will now be described.

According to the present embodiment, when a user inputs the longitudinal length L and the transverse length d of a cleaning region, and the position where cleaning is completed (whether cleaning is completed on the side opposite to the working start side (FIG. 20A) or on the same side as the working start side (FIG. 20B)) to controller 2, a returning pitch length P of U-turn is calculated automatically and zigzag running is carried out.

The user transmits an instruction of zigzag running to cleaning robot 1 by controller 2. The user can designate right zigzag running by pushing the right direction part of cross-shaped cursor button 35 while pushing zigzag button 45 included in operation shift button group 40 of the controller shown in FIG. 2. Similarly, the user can designate left zigzag running by pushing the left direction part of cross-shaped cursor button 35 while pushing zigzag button 45.

At this time, the zigzag menu shown in FIG. 5 is displayed on display unit 49.

In the zigzag menu, the user inputs the forward running distance (longitudinal length) L of zigzag running and the running width (transverse distance) d thereof.

Further, the user designates whether running is completed on this side or the opposite side. When completion on this side is designated, a downward arrow is displayed at "END" in the zigzag menu, and when completion on the opposite side is designated, an upward arrow is displayed.

After completing all the setting, the user pushes set button 53. When set button 53 is pushed, a control command is transmitted to cleaning robot 1 through communication unit 48 of controller 2. Running portion CPU 27 inside the cleaning robot calculates a U-turn pitch by the processing shown in the flow chart of FIG. 18 based on the three input conditions (L, D, running completion position), and then carries out zigzag running.

Figure 18:
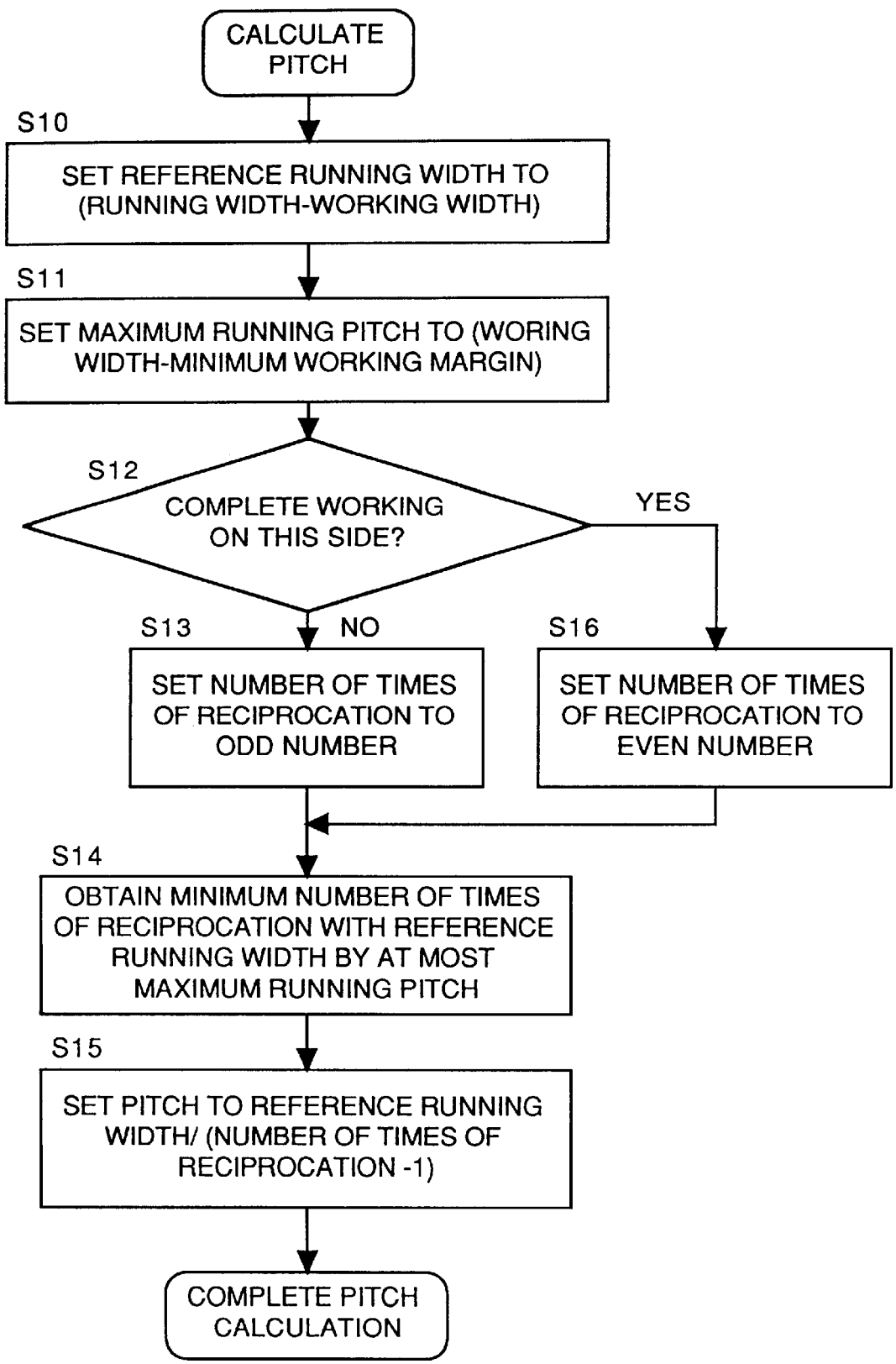
FIG. 18 is a flow chart showing the processing of calculation of a U-turn pitch in zigzag running according to a second embodiment.

Referring to FIG. 18, a reference running width W0 is calculated according to the following expression (1) in the step S10.

$$W0=d-Y \quad (1)$$

Note that in the above expression (1), a variable Y is the width of a region where the cleaning robot can carries out working when moving straight (corresponding to L in FIG. 14).

Then, in the step S11, the maximum running pitch P1 is calculated according to the following expression (2).

$$P1 = Y - W3 \qquad (2)$$

Figure 19:
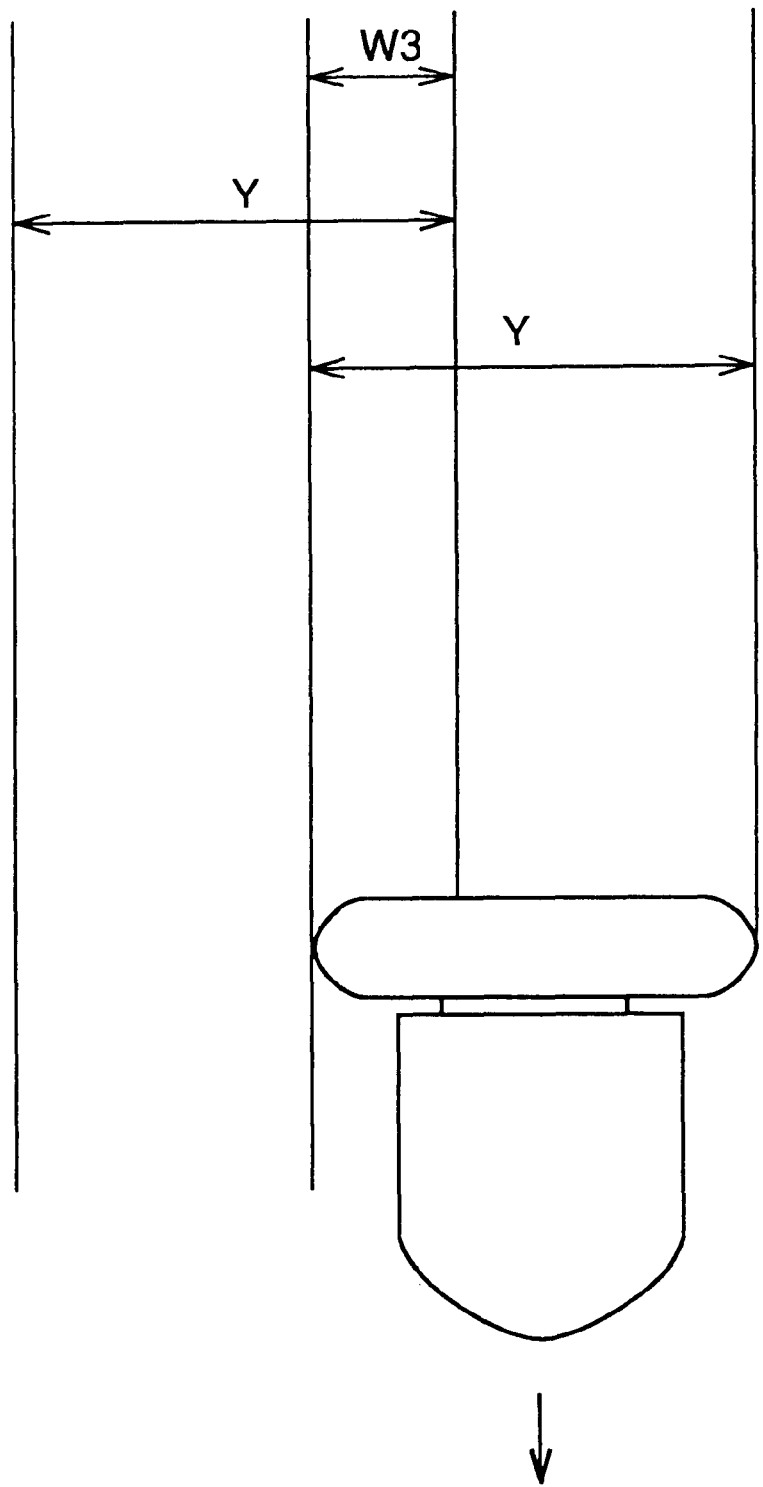
FIG. 19 is a diagram for use in illustration of reciprocation of the cleaning robot.

Note that in the above expression (2), a variable W3 is the minimum working margin. The minimum working margin is the minimum value of an overlapping width of a working width in the forward movement of cleaning robot 1 and a working width in the backward movement, as shown in FIG. 19.

In the step S12, whether working is completed on this side or not is determined.

If YES at the step S12, the number of times the cleaning robot moves in the backward and forward directions is set to an even number in the step S16. If NO in the step S12, the number of times is set to an odd number in the step S13.

Then, in the step S14, the minimum number of times n the cleaning robot can run in forward and backward directions with reference running width W0 by a pitch equal to or lower than the maximum running pitch P1 is obtained. At this time, the number of times n is set to an odd number or an even number according to the content determined in the step S13 or S16.

In the step S15, a U-turn pitch P is calculated according to the following expression (3).

$$P = W0/(n-1) \qquad (3)$$

Note that in the above expression (3), a variable n is the number of times obtained in the step S14.

Zigzag running is carried out with thus calculated pitch P.

Figure 20A:
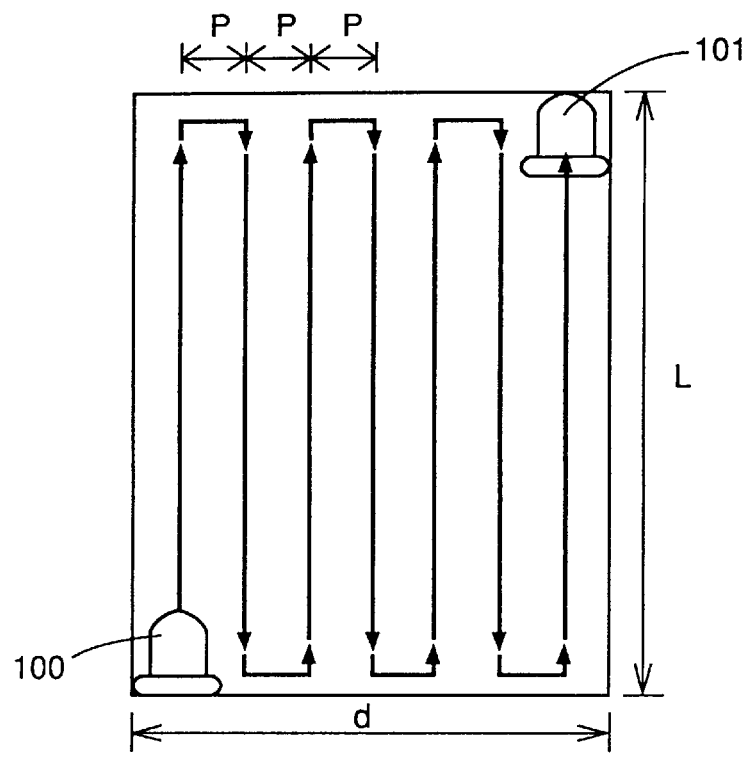
FIGS. 20A and 20B are diagrams for use in illustration of zigzag running of a cleaning robot according to the second embodiment of the invention.

More specifically, if running is completed on the opposite side, running shown in FIG. 20A is carried out within the set range. If running is completed on this side, running shown in FIG. 20B is carried out.

Figure 20B:
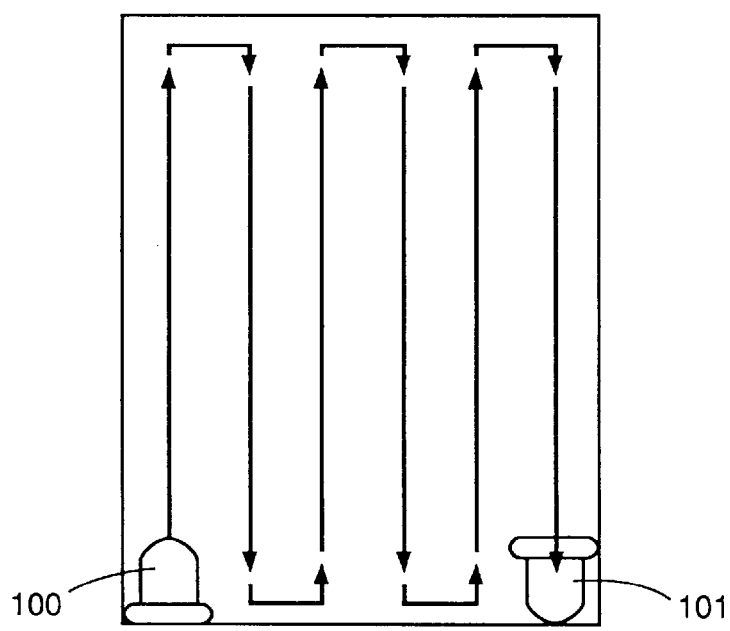

Note that although right zigzag running is shown in FIGS. 20A and 20B, the same is applied to left zigzag running.

Note that although a U-turn pitch is calculated inside the cleaning robot in the present embodiment, it may be calculated inside the controller, which in turn transmits each instruction of move forward, make a U-turn or the like to the cleaning robot.

When setting a completion position, the user can not only select whether zigzag running is completed on this side or the opposite side but also make the cleaning robot complete its operation after working of the portion where the robot stops upon completion of zigzag running. If such operation is designated, a bordered arrow is displayed at "END" in the zigzag menu shown in FIG. 5.

Figure 21:
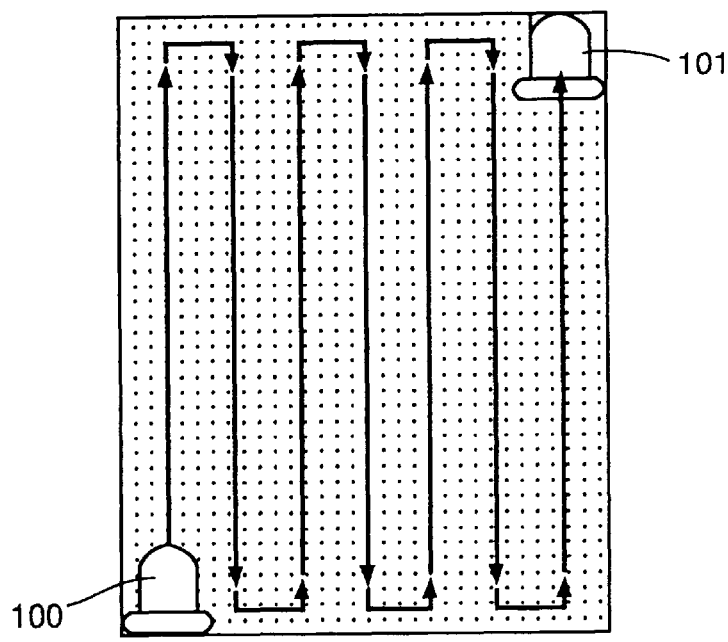
FIG. 21 is a first diagram showing the state obtained upon completion of zigzag running.
Figure 23:
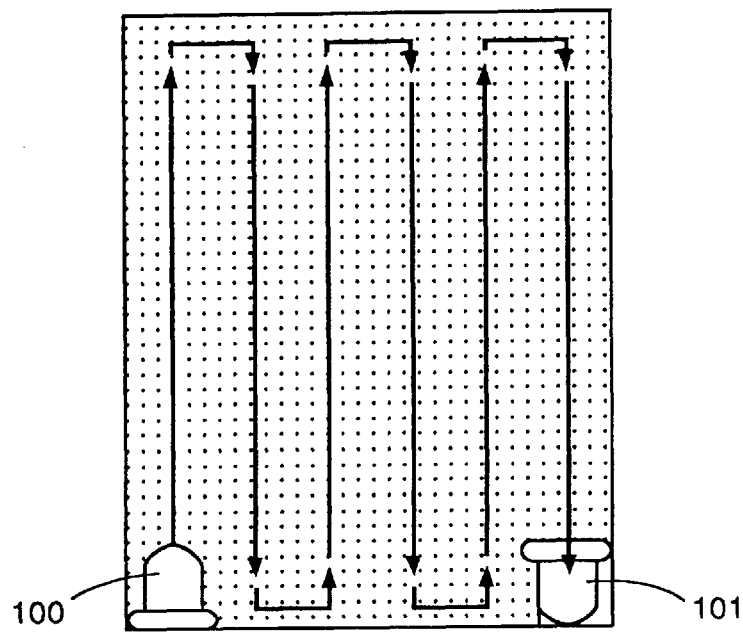
FIG. 23 is a second diagram showing the state obtained upon completion of zigzag running.

More specifically, since cleaning unit 31 of the cleaning robot according to the present embodiment is located behind with respect to the moving direction, the cleaning robot cannot carry out working of the portion at completion position 101 as shown in FIG. 21 or 23 by merely performing zigzag running.

Figure 22:
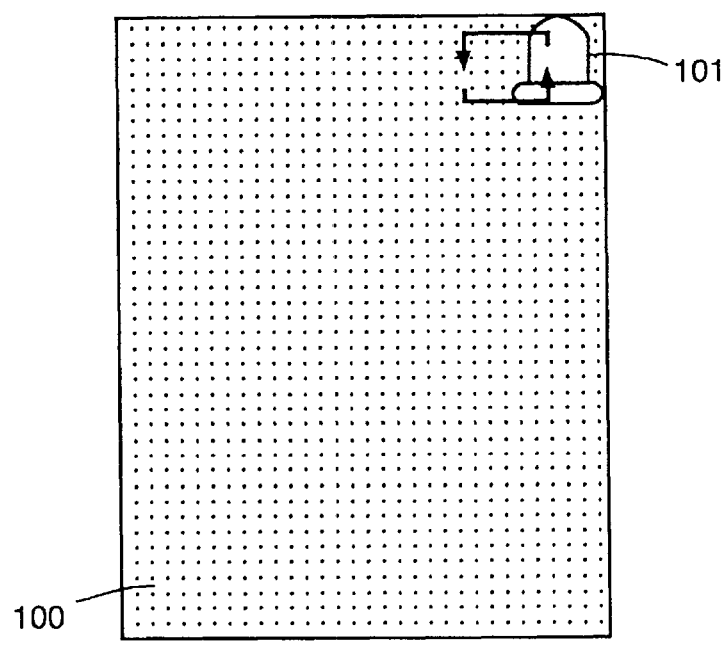
FIG. 22 is a diagram for use in illustration of operation carried out by the cleaning robot from the state shown in FIG. 21.
Figure 24:
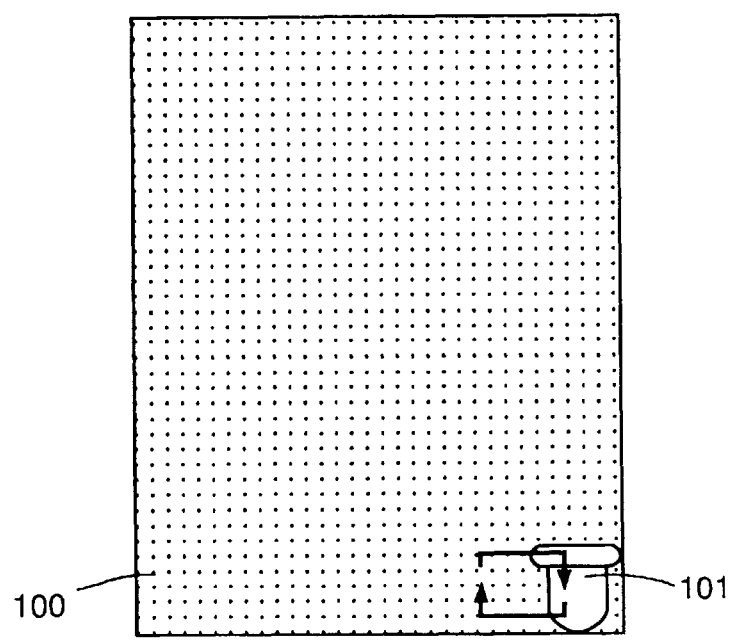
FIG. 24 is a diagram showing operation carried out by the cleaning robot from the state shown in FIG. 23.

When the cleaning robot is set to carry out working of the portion where it stops upon completion of zigzag running, U-turn operation is performed twice after completion of zigzag running, as shown in FIG. 22 or 24. Thus, all the designated region have been subjected to working.

Figure 25:
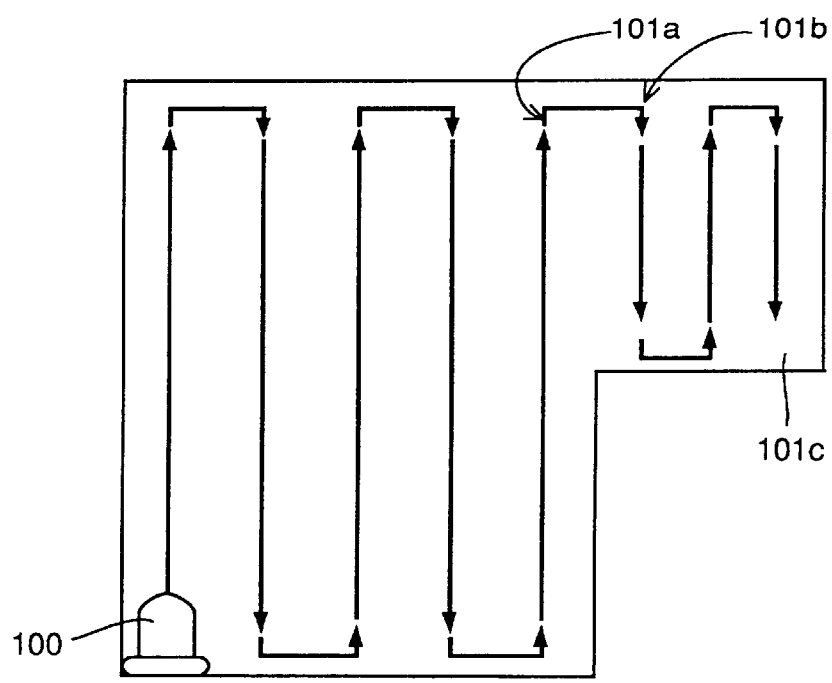
FIG. 25 is a diagram for use in illustration of the effects of the invention.
Figure 26:
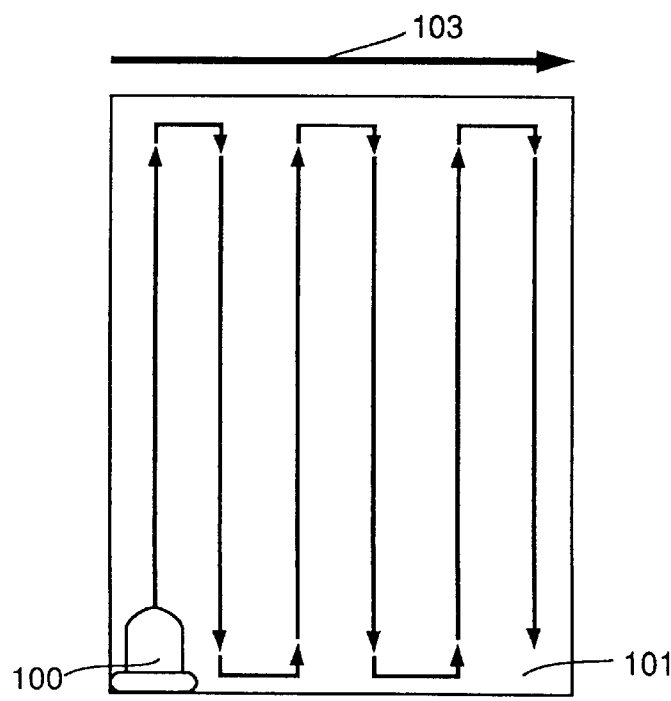
FIG. 26 is a diagram showing zigzag running to the right.
Figure 27:
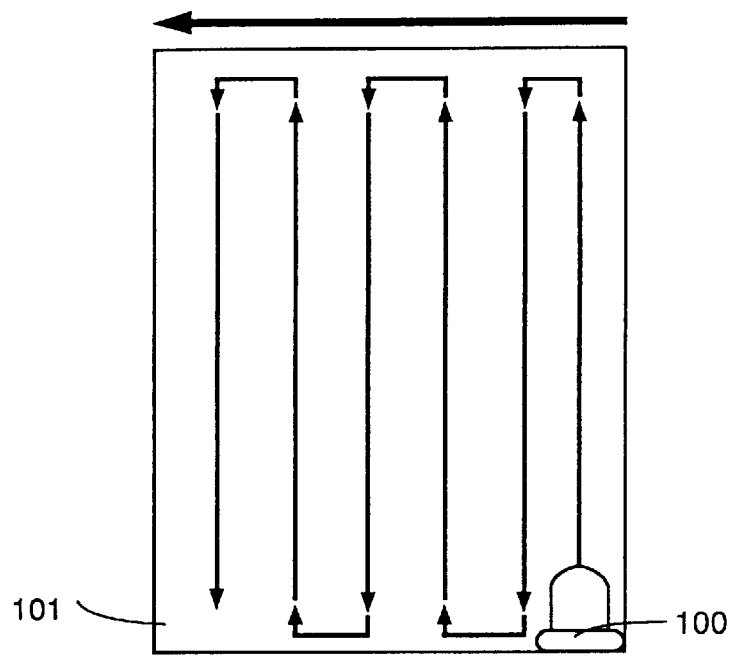
FIG. 27 is a diagram showing zigzag running to the left.
Figure 28:
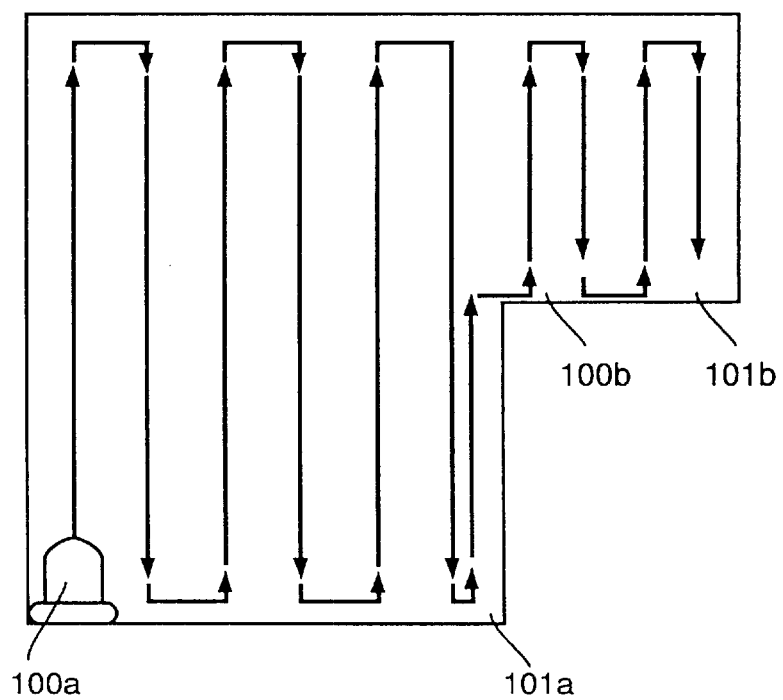
FIG. 28 is a diagram for use in illustration of the problems of the related art.

With the use of the cleaning robot of the present embodiment, even if working of a region formed of two consecutive rectangular areas is to be carried out as shown for example in FIG. 25, re-running in the working region can be prevented by setting a completion position of the first zigzag running to the position 101a located opposite to the working start side 100, causing the cleaning to make a U-turn at the position 101b where the second zigzag running is started, and setting a completion position of the second zigzag running to the position 101c located opposite to the start position 101b thereof.

Note that the above robot has been described to be used for cleaning, but the present invention may be applied to a robot for merely running without working.

In addition, the present invention may be applied to a robot for running in order to search for an object.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving apparatus for moving on a floor, covering an entire accessible surface of said floor, comprising:

running control means for controlling the moving apparatus to run along running lanes in a zigzag fashion by repeatedly carrying out control including the steps of;

detecting presence of an obstacle while running in a Y direction, storing a Y coordinate of said detected obstacle, and upon detection of said obstacle, stopping running in said Y direction, moving by a prescribed pitch in an X direction perpendicular to said Y direction, and thereafter running in a direction opposite to said Y direction; and recognizing means for recognizing, when the moving apparatus travels in a current running lane in the Y direction beyond the previously stored Y coordinate of the obstacle, presence of a remaining running region between the current running lane and said obstacle and not yet covered by the moving apparatus.

2. The moving apparatus as recited in claim 1, further comprising:

remaining running region control means for controlling, when said recognizing means recognizes a remaining running region, the moving apparatus to run the recognized remaining running region.

3. The moving apparatus as recited in claim 2, further comprising:

measuring means for measuring a width of the remaining running region recognized by said recognizing means.

4. The moving apparatus as recited in claim 3, wherein said remaining running region control means controls running in the remaining running region according to the width measured by said measuring means.

5. The moving apparatus as recited in claim 1, wherein when said recognizing means recognizes presence of a remaining running region, running in the Y direction is continued, and when another obstacle to running is detected, running in the Y direction is stopped and running in the recognized remaining running region is carried out.

6. The moving apparatus as recited in claim 1, wherein when said recognizing means recognizes presence of a remaining running region, running in the Y direction is continued, and after running a prescribed distance, said running in the Y direction is stopped to carry out running in the recognized remaining running region.

7. The moving apparatus as recited in claim 1, wherein when said recognizing means recognizes a remaining running region, running in the Y direction is continued, and upon running beyond said obstacle, said running in the Y direction is stopped to carry out running in the recognized remaining running region.

8. A moving apparatus for moving on a floor, covering an entire accessible surface of said floor, comprising:
   measuring means for measuring a distance up to a first obstacle existing in a first direction;
   operation means for determining a predescribed pitch for the apparatus to move in the first direction according to the distance measured by said measuring means; and
   running control means for controlling the moving apparatus to run along running lanes in a zigzag fashion, whereby the moving apparatus repeatedly,
      runs in one of a plurality of lanes in a second direction,
      moves the predescribed in the first direction perpendicular to said second direction, and
      thereafter runs in one of a plurality of lanes in a third direction, opposite to said second direction.
   storing a Y coordinate of the obstacle; and
   upon running in a current one of the plurality of lanes in the Y direction beyond the Y coordinate of the obstacle, recognizing presence of a remaining running region between the current running lane and the obstacle not yet covered by the moving apparatus.

9. The moving apparatus as recited in claim 8, wherein said measuring means periodically measures the distance up to the first obstacle, and said running control means controls the zigzag running a predescribed pitch determined by said operation means based on a minimum value of the distance periodically measured by said measuring means.

10. The moving apparatus as recited in claim 9, wherein, while running in a final lane along the first obstacle, if the moving apparatus detects a presence of a remaining region between said final lane and a second obstacle not yet covered by the moving apparatus, the running in said final lane is interrupted to carry out running in the remaining region, and upon completing the running in the remaining region, the moving apparatus returns to complete the running in said final lane.

11. A method of moving a moving apparatus on a floor surface to cover an entire accessible area of the floor surface, said method comprising the steps of:
   running along running lanes in a zigzag fashion by beginning at a starting Y coordinates, and, repeatedly; running along one of plurality of lanes in a Y direction until detecting an obstacle, moving by a predescribed pitch in an X direction perpendicular to the Y direction, and running in one of a plurality of lanes in a direction opposite to the Y direction until the starting Y coordinate is reached;
   storing a Y coordinate of the obstacle; and
   upon running in a current one of the plurality of lanes in the Y direction beyond the Y coordinate of the obstacle, recognizing presence of a remaining running region between the current running lane and the obstacle not yet covered by the moving apparatus.

12. The method as recited in claim 11, further comprising the step of:
   running said remaining running region.

13. The method as recited in claim 12, further comprising the step of:
   measuring a width of said remaining running region.

14. The method as recited in claim 13, wherein
said step of running said remaining running region carries out running based on the measured width of said remaining running region.

15. The method as recited in claim 11, further comprising the steps of:
   further running the current running lane after recognizing presence of said remaining running region until detecting a second obstacle; and
   upon detecting the second obstacle, stopping running the current running lane to run said recognized remaining running region.

16. The method as recited in claim 11, further comprising the steps of:
   further running the current running lane after recognizing presence of said remaining running region; and
   after running a predescribed distance in the current running lane, stopping running the current running lane to run said recognized remaining running region.

17. The method as recited in claim 11, further comprising the steps of:
   further running the current running lane after recognizing presence of said remaining running region;
   detecting disappearance of said obstacle in a lateral direction;
   after detecting disappearance of said obstacle, stopping running the current running lane to run said recognized remaining running region.

18. The method as recited in claim 17, further comprising the step of:
   recognizing presence of a region where the moving apparatus has not run yet in a place where said obstacle has disappeared.

19. The method as recited in claim 18, further comprising the step of:
   running said region where said moving apparatus has not run yet, after running said remaining running region.

20. A method of moving a moving apparatus on a floor surface to cover an entire accessible area of the floor surface, said method comprising the steps of:
   measuring a distance up to an obstacle in an X direction;
   determining a predescribed pitch for the apparatus to move in the X direction based on said measured distance; and
   running along running lanes in a zigzag fashion by beginning at a starting coordinate in a Y direction, and, repeatedly; running along one of plurality of lanes in the Y direction, moving by the predescribed pitch in the X direction perpendicular to the Y direction, and running in one of a plurality of lanes in a direction opposite to the Y direction until the starting coordinate in the Y direction is reached.

21. The method as recited in claim 20, wherein said measuring comprises periodically measuring, while running, the distance up to the obstacle, and said determining comprises performing an operation to determine said predescribed pitch based on a minimum value of said periodically measured distance.

22. The method as recited in claim 20, further comprising the steps of:
   recognizing a presence of a remaining region where said moving apparatus has not run yet while running in a lane along said obstacle; and
   upon recognizing the presence of said remaining region stopping running in the lane along said obstacle to run said remaining region.

23. The method as recited in claim 22, further comprising the step of, upon completing the running in the remaining region, returning to complete the running in the lane along said obstacle.

24. A moving apparatus for moving on a floor, covering an entire accessible surface of said floor, comprising:

measuring means for periodically measuring a distance up to an obstacle existing in a first direction;

operation means
for determining a predescribed pitch for the apparatus to move in the first direction according to the distance measured by said measuring means, and
for modifying the predescribed pitch according to a minimum value of the distance measured by said measuring means;

running control means for controlling the moving apparatus to run along running lanes in a zigzag fashion, whereby the moving apparatus repeatedly, runs in one of a plurality of lanes in a second direction, moves the predescribed pitch in the first direction perpendicular to said second direction, and thereafter runs in one of a plurality of lanes in a third direction, opposite to said second direction; and recognizing means for recognizing, while running in a final lane along the obstacle corresponding to the minimum value of the distance measured by the measuring means, presence of a remaining running region between the final lane and a second obstacle and not yet covered by the moving apparatus.

25. The moving apparatus as recited in claim 24, wherein, when the recognizing means recognizes the presence of a remaining running region, the running control means interrupts the running in the final lane and controls the moving apparatus to perform running in the remaining running region, and then returns the moving apparatus to the final lane to continue running therein.

26. A method of moving a moving apparatus on a floor surface to cover an entire accessible area of the floor surface, said method comprising the steps of:

periodically measuring a distance up to an obstacle in an X direction;

determining a predescribed pitch for the apparatus to move in X direction based on the measured distance;

modifying said predescribed pitch based on a minimum value of said measured distance;

running along running lanes in a zigzag fashion by beginning at a starting coordinate in a Y direction, and, repeatedly, running along one of plurality of lanes in the Y direction, moving by the predescribed pitch in the X direction perpendicular to the Y direction, and running in one of a plurality of lanes in a direction opposite to the Y direction until the starting Y coordinate is reached; and while running in a final lane along the obstacle corresponding to the minimum value of the measured distance, recognizing presence of a region between the final lane and a second obstacle where the moving apparatus has not run yet.

27. The method of claim 26, further comprising the step of, upon recognizing the presence of a region where the moving apparatus has not run yet, stopping running the final lane to run the recognized region.

* * * * *